United States Patent
Wu et al.

(10) Patent No.: US 12,386,250 B2
(45) Date of Patent: Aug. 12, 2025

(54) LASER PROJECTION APPARATUS

(71) Applicant: HISENSE LASER DISPLAY CO., LTD, Shandong (CN)

(72) Inventors: Kai Wu, Shandong (CN); Zhen Wang, Shandong (CN)

(73) Assignee: HISENSE LASER DISPLAY CO., LTD, Qingdao (CN)

( * ) Notice: Subject to any disclaimer, the term of this patent is extended or adjusted under 35 U.S.C. 154(b) by 189 days.

(21) Appl. No.: 18/446,321

(22) Filed: Aug. 8, 2023

(65) Prior Publication Data

US 2023/0384659 A1 Nov. 30, 2023

Related U.S. Application Data

(63) Continuation of application No. 17/381,760, filed on Jul. 21, 2021, now Pat. No. 11,762,270, which is a
(Continued)

(30) Foreign Application Priority Data

Jun. 20, 2019 (CN) .......................... 201910539233.1

(51) Int. Cl.
*G03B 21/20* (2006.01)
*H04N 9/31* (2006.01)

(52) U.S. Cl.
CPC ..... *G03B 21/2053* (2013.01); *G03B 21/2033* (2013.01); *H04N 9/3155* (2013.01); *H04N 9/3158* (2013.01); *H04N 9/3161* (2013.01)

(58) Field of Classification Search
CPC ............ G03B 21/2053; G03B 21/2033; G03B 21/20; H04N 9/3155; H04N 9/3158; H04N 9/3161; H04N 9/3114; H04N 5/64
(Continued)

(56) References Cited

U.S. PATENT DOCUMENTS

2005/0030264 A1 2/2005 Tsuge et al.
2005/0265419 A1 12/2005 Fujii et al.
(Continued)

FOREIGN PATENT DOCUMENTS

CN 101101434 A 1/2008
CN 101600120 A 12/2009
(Continued)

OTHER PUBLICATIONS

International Search Report and Written Opinion mailed Jul. 29, 2020 in corresponding International Application No. PCT/CN2020/089089, translated, 17 pages.
(Continued)

*Primary Examiner* — Magda Cruz
(74) *Attorney, Agent, or Firm* — MH2 TECHNOLOGY LAW GROUP LLP

(57) ABSTRACT

A laser projection apparatus includes a display control circuit, a laser source, a laser source driving circuit, and a light modulation device. The display control circuit includes an algorithm processor and a control processor. The algorithm processor is configured to: determine a gain value α of each frame of image according to a gray scale value of each frame of image, and transmit N current control signals, M enable signals, and image display data to the control processor. The control processor is configured to: transmit the N current control signals and the M enable signals to the laser source driving circuit; and transmit the image display data to the light modulation device. The light modulation device is configured to modulate beams emitted by the laser source according to the image display data to generate image beams.

20 Claims, 18 Drawing Sheets

Related U.S. Application Data continuation-in-part of application No. PCT/CN2020/089089, filed on May 8, 2020.

(58) Field of Classification Search
USPC .......................................................... 348/744
See application file for complete search history.

(56) References Cited

U.S. PATENT DOCUMENTS

| | | |
|---|---|---|
| 2007/0085975 A1 | 4/2007 | Chou |
| 2008/0024528 A1 | 1/2008 | Han et al. |
| 2011/0128507 A1 | 6/2011 | Suzuki et al. |
| 2014/0240611 A1 | 8/2014 | Kimura et al. |
| 2016/0014399 A1 | 1/2016 | Wang et al. |
| 2016/0164256 A1* | 6/2016 | Kuratomi .......... G03B 21/2033 315/297 |
| 2017/0214893 A1* | 7/2017 | Naftali ................. H04N 9/3161 |
| 2017/0280117 A1 | 9/2017 | Ogi et al. |
| 2019/0191132 A1 | 6/2019 | Kobayashi et al. |
| 2019/0369473 A1 | 12/2019 | Lyu et al. |
| 2021/0127098 A1 | 4/2021 | Hu et al. |

FOREIGN PATENT DOCUMENTS

| | | |
|---|---|---|
| CN | 103716614 A | 4/2014 |
| CN | 105578162 A | 5/2016 |
| CN | 105629483 A | 6/2016 |
| CN | 106026640 A | 10/2016 |
| CN | 106249530 A | 12/2016 |
| CN | 107870502 A | 4/2018 |
| CN | 108333857 A | 7/2018 |
| CN | 108737798 A | 11/2018 |
| CN | 108957930 A | 12/2018 |
| CN | 109417615 A | 3/2019 |
| CN | 109426054 A | 3/2019 |
| CN | 109474812 A | 3/2019 |
| CN | 210270493 U | 4/2020 |
| EP | 3293564 A1 | 3/2018 |
| JP | 2007292823 A | 11/2007 |
| JP | 2017173716 A | 9/2017 |

OTHER PUBLICATIONS

International Search Report and Written Opinion mailed Aug. 12, 2020 in International Application No. PCT/CN2020/089092, translated, 14 pages.
Chinese First Office Action mailed May 19, 2021 in corresponding Chinese Application No. 201910539233.1, translated, 18 pages.
Chinese Second Office Action mailed Nov. 30, 2021 in corresponding Chinese Application No. 201910539233.1, translated, 20 pages.
Non-Final Office Action dated Jan. 25, 2023 in parent U.S. Appl. No. 17/381,760, 18 pages.
Notice of Allowance dated May 9, 2023 in parent U.S. Appl. No. 17/381,760, 11 pages.
Corrected Notice of Allowability dated May 17, 2023 in parent U.S. Appl. No. 17/381,760, 2 pages.

\* cited by examiner

LASER PROJECTION APPARATUS

CROSS-REFERENCE TO RELATED APPLICATIONS

This application is a continuation application of U.S. patent application Ser. No. 17/381,760, filed on Jul. 21, 2021, pending, which is a continuation-in-part of International Application PCT/CN2020/089089 filed on May 8, 2020, and claims priority to Chinese Patent Application No. 201910539233.1, filed on Jun. 20, 2019, which are incorporated herein by reference in their entireties.

TECHNICAL FIELD

The present disclosure relates to the field of projection display, and in particular, to a laser projection apparatus.

BACKGROUND

Laser projection apparatuses, such as ultra-short-focus laser televisions, have been widely used in the display field due to their advantages of high color purity, large color gamut, high brightness, and the like.

A light source system of a current laser television usually includes a laser source, a fluorescent wheel, and a color filter wheel, and the laser source is usually a blue laser for emitting blue laser light. The blue laser light sequentially irradiates three different region of the fluorescent wheel to generate light of three colors, and the light of the three colors is sequentially filtered by the color filter wheel to obtain light of three colors with higher purity.

SUMMARY

A laser projection apparatus is provided. The laser projection apparatus includes a display control circuit, a laser source, a laser source driving circuit connected to the display control circuit and the laser source, and a light modulation device. The display control circuit is configured to generate N current control signals and M enable signals that correspond to each of a plurality of frames of images, and select an effective current control signal from the N current control signals. The M enable signals are in one-to-one correspondence with M primary colors of each frame of image, N is an integer greater than 2, and M is a positive integer. The laser source is configured to emit laser light of at least one color. The laser source driving circuit is configured to control the laser source to emit light according to the effective current control signal. The display control circuit includes an algorithm processor and a control processor. The algorithm processor is connected to the control processor, and the control processor is further connected to the light modulation device. The algorithm processor is configured to determine a gain value α of each frame of image according to a gray scale value of each frame of image and transmit the N current control signals, the M enable signals, and image display data to the control processor, wherein α is greater than or equal to 1 ($α≥1$), each N current control signal is configured to indicate a corresponding adjusted brightness of the laser source, and the adjusted brightness is $1/α$ of a brightness before the adjustment. The control processor is configured to transmit the N current control signals and the M enable signals to the laser source driving circuit and transmit the image display data to the light modulation device. The image display data is configured to indicate an adjusted gray scale value of each frame of image, and the adjusted gray scale value of each frame of image is α times a gray scale value of each frame of image before the adjustment. The light modulation device is configured to modulate beams emitted by the laser source according to the image display data to generate image beams.

BRIEF DESCRIPTION OF THE DRAWINGS

In order to describe embodiments of the present application more clearly, accompanying drawings to be used in description of the embodiments will be introduced briefly. Obviously, the accompanying drawings to be described below are merely some embodiments of the present disclosure, and a person of ordinary skill in the art may obtain other drawings according to these drawings without paying any creative effort. The accompanying drawings herein are incorporated into the description and constitute a part of this description, and show embodiments consistent with the present disclosure, and are used to explain principles of the present disclosure together with the description.

DETAILED DESCRIPTION

In order to make purposes, technical solutions, and advantages of the present disclosure clearer, the present disclosure will be further described in detail below in conjunction with the accompanying drawings. Obviously, the described embodiments are merely some but not all embodiments of the present disclosure. All other embodiments obtained by a person of ordinary skill in the art based on the embodiments of the present disclosure without paying any creative effort shall be included in the protection scope of the present disclosure.

Unless the context requires otherwise, the term "comprise" and other forms thereof such as the third-person singular form "comprises" and the present participle form "comprising" throughout the description and the claims are construed as open and inclusive meaning, i.e., "including, but not limited to." In the description, the terms such as "one embodiment," "some embodiments," "exemplary embodiments," "example," "specific example," or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics described herein may be included in any one or more embodiments or examples in any suitable manner.

Hereinafter, terms such as "first" or "second" are only used for descriptive purposes and are not to be construed as indicating or implying the relative importance or implicitly indicating the number of indicated technical features below. Thus, features defined as "first" or "second" may explicitly or implicitly include one or more of the features. In the description of the embodiments of the present disclosure, the term "a/the plurality of" means two or more unless otherwise specified.

In the description of some embodiments, the expression "connected" and its extensions may be used. For example, the term "connected" or "electrically connected" may be used in the description of some embodiments to indicate that two or more components are in direct physical or electrical contact with each other. However, the term "connected" or "electrically connected" may also mean that two or more components are not in direct contact with each other, but still cooperate or interact with each other. The embodiments disclosed herein are not necessarily limited to the contents herein.

The use of the phrase "configured to" herein means an open and inclusive language, which does not exclude devices that are configured to perform additional tasks or steps.

Figure 1:
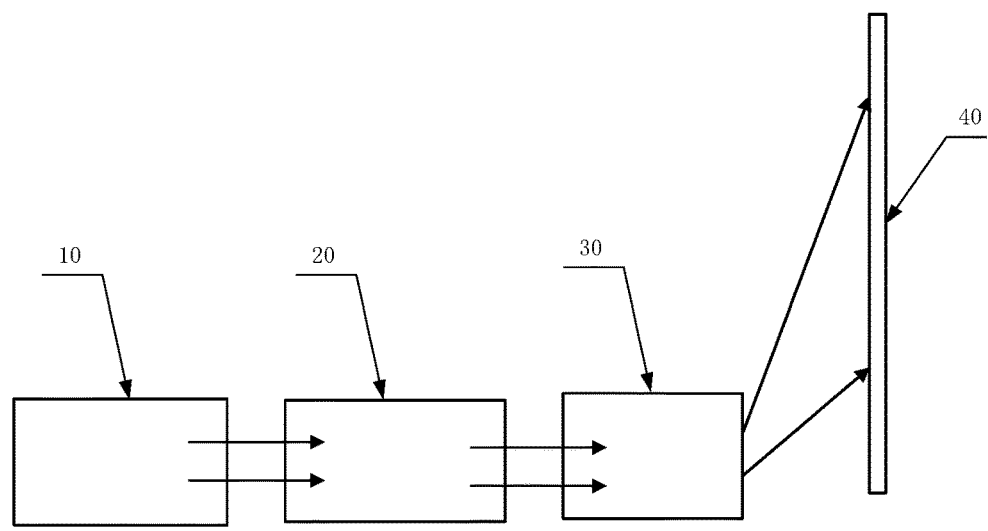
FIG. 1 is a schematic diagram of an implementation environment of a laser projection apparatus, in accordance with some embodiments of the present disclosure.

Referring to FIG. 1, it shows a schematic diagram of an implementation environment involved in some embodiments of the present application. The implementation environment may include a projection light source 10, an optical machine 20, and a projection lens 30. The projection light source 10, the optical machine and the projection lens 30 are arranged in sequence in a transmission direction of beams. The projection light source 10 is configured to emit beams. The optical machine is configured to modulate the beams to generate image beams when irradiated by the beams emitted by the projection light source 10. The projection lens 30 is configured to project the image beams onto a projection screen 40.

In some embodiments, the projection light source 10, the optical machine 20, and the projection lens 30 may be applied to a laser projection apparatus such as a laser television. The projection light source may include at least one laser. In this way, the projection light source is configured to emit laser light of at least one color. For example, the projection light source may be a mono-color projection light source (i.e., including one laser, and the laser emitting laser light of one color), or it may be a dual-color projection light source (i.e., including a plurality of lasers, and the plurality of lasers emitting laser light of two colors in total).

Figure 2:
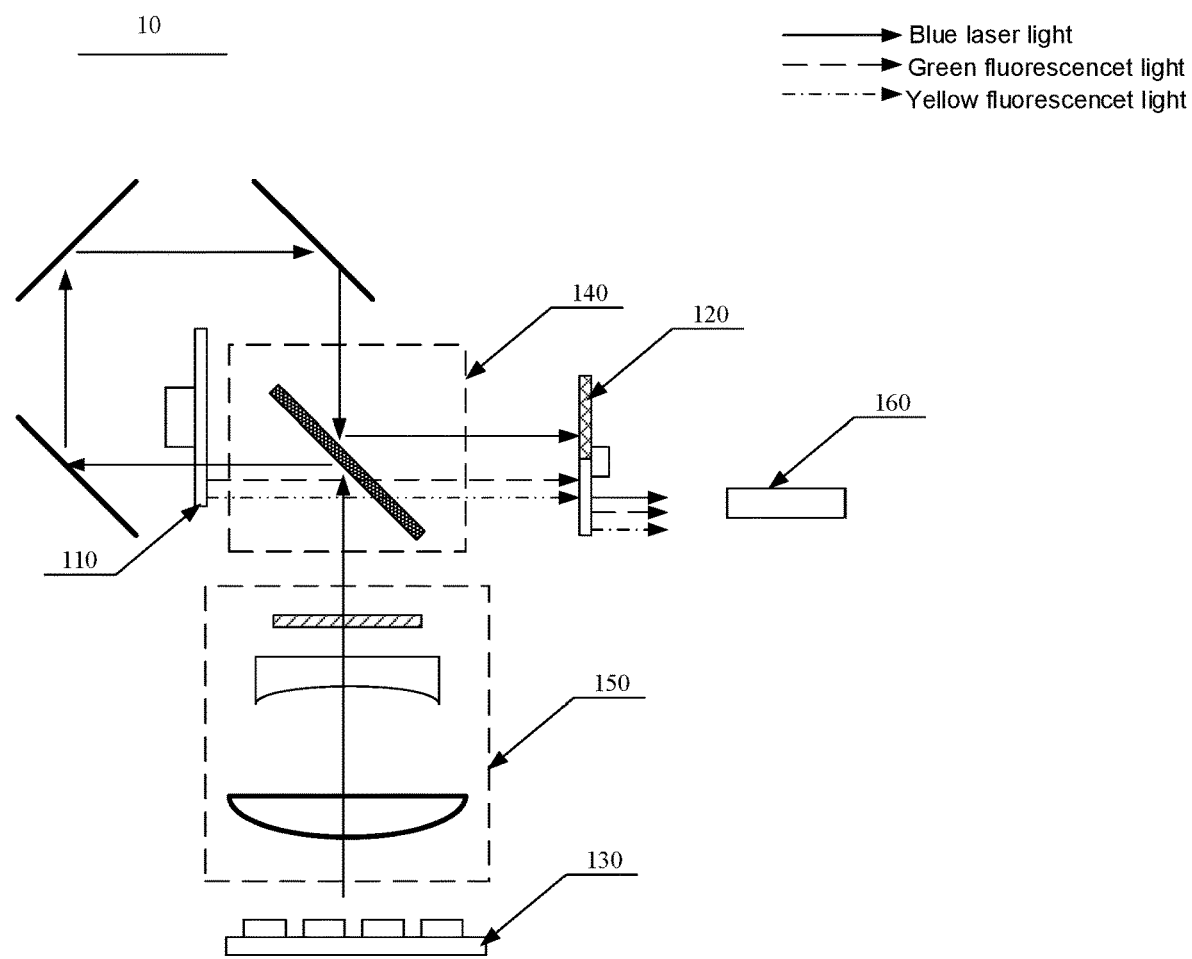
FIG. 2 is a schematic diagram of a projection laser source, in accordance with some embodiments of the present disclosure.

In some embodiments, as shown in FIG. 2, the projection light source 10 includes at least a fluorescent wheel 110, a color filter wheel 120, a blue laser source 130, a light combining component 140, a beam shaping component 150, and a light collecting component 160. The blue laser source 130, the beam shaping component 150, the light combining component 140, the fluorescent wheel 110, the color filter wheel 120, and the light collecting component 160 are arranged in sequence in a transmission direction of blue laser light. The blue laser source 130 is configured to emit blue laser light. The beam shaping component 150 is configured to perform contraction processing on the blue laser light emitted by the blue laser source 130 to obtain contracted collimated blue laser light and transmit the collimated blue laser light to the light combining component 140. The light combining component 140 is configured to transmit the received blue laser light to the fluorescent wheel 110.

The light combining component 140 is further configured to transmit the blue laser light transmitted by the fluorescent wheel 110 to the color filter wheel 120. The blue laser light irradiates a transmission region and then passes through the transmission region. The light combining component 140 is further configured to transmit fluorescent light emitted by the fluorescent wheel 110 to the color filter wheel 120. The fluorescent light is generated by irradiating a fluorescent region with the blue laser light. The color filter wheel 120 is configured to sequentially output red light, blue light, and green light when rotating. The red light and the green light are obtained by filtering the fluorescent light by the color filter wheel 120. The blue light is obtained by transmitting the blue laser light by the color filter wheel 120. The light collecting component 160 is configured to perform light homogenization processing on the red light, the blue light, and the green light.

A light emitting process of the projection light source is that: the blue laser light emitted by the blue laser source 130 is shaped by the beam shaping device 150, then emitted to the light combining component 140, and then transmitted to the fluorescent wheel 110; the fluorescent wheel 110 rotates in sequence, and when the blue laser light irradiates the transmission region of the fluorescent wheel 110, the blue laser light passes through the fluorescent wheel 110, then passes through the light combining component 140 again after passing through a relay loop optical path of the blue laser light (i.e., an optical path loop where the blue laser light is transmitted from the fluorescent wheel 110 to the light combining component 140 in FIG. 2), and then enters the light collecting component 160 after passing through the filter color wheel 120; and when the blue laser light irradiates the fluorescent region of the fluorescent wheel 110, fluorescent powder in the fluorescent region is excited to emit fluorescent light of at least one color (e.g., at least one of yellow fluorescent light and green fluorescent light in FIG. 2), and the excited fluorescent light is transmitted in a reverse direction, and is reflected by the light combining component 140 to the color filter wheel 120, and then enters the light collecting component 160. The light of the three colors (abbreviated as three-color light) passes through the light collecting component 160, and then is modulated by the optical machine 20 to generate image beams. The image beams are transmitted to the projection lens 30 to finally achieve image output of the three-color light.

However, a laser source of a current laser projection apparatus usually is only able to provide laser light with a fixed brightness, and thus a final display effect of the laser projection apparatus is poor.

Figure 3:
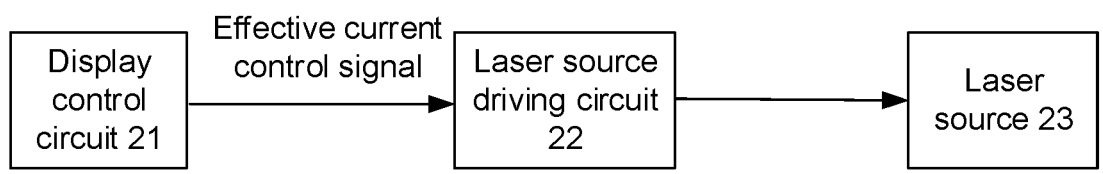
FIG. 3 is a schematic diagram of a laser projection apparatus, in accordance with some embodiments of the present disclosure.

Some embodiments of the present disclosure provide a laser projection apparatus. As shown in FIG. 3, the laser projection apparatus includes a display control circuit 21, a laser source driving circuit 22, and a laser source 23. The laser source driving circuit 22 is connected to the display control circuit 21 and the laser source 23.

In some embodiments, the laser source 23 may be a mono-color laser source, such as a red laser source, or the blue laser source 130 shown in FIG. 2.

The display control circuit 21 is configured to generate N current control signals corresponding to each of a plurality of frames of images, select an effective current control signal from the N current control signals, and transmit the effective current control signal to the laser source driving circuit 22. The N current control signals include mono-color current control signals that are in one-to-one correspondence with M primary colors of each frame of image and a hybrid-color current control signal. N is an integer greater than 2, and M is a positive integer.

Each mono-color current control signal is used to control a current when a corresponding primary color is displayed. The hybrid-color current control signal is used to control a current when at least two primary colors (e.g., two primary colors) are simultaneously displayed (e.g., a hybrid color being generated when at least two primary colors are simultaneously displayed). For example, N is equal to 4 (N=4), and M is equal to 3 (M=3). The four current control signals may be a red current control signal, a green current control signal, a blue current control signal, and a hybrid-color current control signal. The red current control signal is used to control a current when a red color is displayed; the green current control signal is used to control a current when a green color is displayed; the blue current control signal is used to control a current when a blue color is displayed; and the hybrid-color current control signal is used to control a current when at least two primary colors of the red color, the green color, and the blue color are simultaneously displayed.

The laser source driving circuit 22 is configured to control the laser source 23 to emit light according to the effective current control signal. For example, the laser source driving circuit 22 may control the laser source 23 to emit light according to the mono-color current control signal, so that the laser projection apparatus displays the corresponding primary color; and the laser source driving circuit 22 may control the laser source 23 to emit light according to the hybrid-color current control signal, so that the laser projection apparatus simultaneously displays at least two primary colors.

Magnitudes of effective current control signals corresponding to at least two of the plurality of frames of images are different. For example, in terms of display timing, the at least two frames of images may be consecutive to each other, or the at least two frames of images may be separated by at least one frame (e.g., one frame, two frames, or more frames) of image.

In summary, in the laser projection apparatus provided in the embodiments of the present disclosure, the display control circuit is able to generate the N current control signals corresponding to each of the plurality of frames of images, select the effective current control signal from the N current control signals, and transmit the effective current control signal to the laser source driving circuit, so that the laser source driving circuit controls the laser source to emit light. Since effective current control signals corresponding to at least two of the plurality of frames of images are different, corresponding laser lighting currents are different when the at least two frames of images, so that dynamic dimming of the laser source may be achieved. As a result, the laser projection apparatus may support a laser source with variable brightness, thereby effectively improving display effect of the laser projection apparatus.

Figure 4:
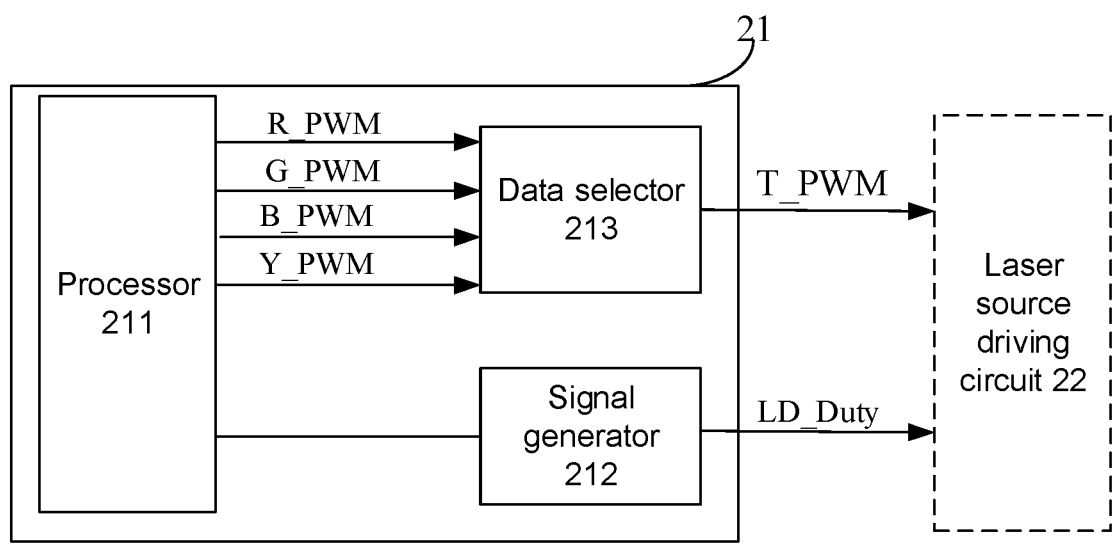
FIG. 4 is a schematic diagram of a display control circuit, in accordance with some embodiments of the present disclosure.

In some embodiments, as shown in FIG. 4, the display control circuit 21 includes a processor 211, a signal generator 212, and a data selector 213. The data selector 213 is connected to the processor 211 and the laser source driving circuit 22. The signal generator 212 is connected to the laser source driving circuit 22.

The processor 211 is configured to generate the N current control signals and M enable signals that correspond to each of the plurality of frames of images and transmit the N current control signals and the M enable signals to the data selector 213.

For example, the mono-color current control signals and the hybrid-color current control signal are all pulse width modulation (PWM) signals.

For example, N is equal to 4 (N=4), M is equal to 3 (M=3). In this case, the four current control signals are a red PWM signal R_PWM, a green PWM signal G_PWM, a blue PWM signal B_PWM, and a hybrid-color PWM signal Y_PWM. The three enable signals are a red enable signal R_EN, a green enable signal G_EN, and a blue enable signal B_EN. For example, an amplitude of a voltage of the hybrid-color PWM signal Y_PWM is 3.3 V, a frequency of the hybrid-color PWM signal Y_PWM 18.3 kHz, and a duty cycle the hybrid-color PWM signal Y_PWM of 50%.

The signal generator 212 is configured to generate a duty cycle control signal LD_duty and transmit the duty cycle control signal LD_duty to the laser source driving circuit 22. The laser source driving circuit 22 may control the laser source 23 to be turned on and off according to the duty cycle control signal LD_duty.

For example, when the duty cycle control signal LD_duty is at a high level, the laser source driving circuit 22 controls the laser source 23 to be turned on; and when the duty cycle control signal LD_duty is at a low level, the laser source driving circuit 22 controls the laser source 23 to be turned off. For example, the laser source 23 is a mono-color laser source, which is always in a turn-on state during the laser projection apparatus displaying an image, so that the duty cycle control signal LD_duty is kept at a high level signal during operation of the laser projection apparatus.

The data selector 213 is configured to receive the N current control signals and the M enable signals, select the effective current control signal T_PWM from the N current control signals according to the M enable signals, and transmit the effective current control signal T_PWM to the laser source driving circuit 22. The effective current control signal T_PWM matches an enable signal at an effective potential in the M enable signals.

The laser source driving circuit 22 is configured to adjust a current of the laser source 23 according to the effective current control signal T_PWM and control the laser source 23 to be turned on and off according to the duty cycle control signal LD_duty.

In some embodiments, the signal generator 212 may generate the duty cycle control signal LD_duty in various manners. In some examples, the signal generator 212 directly generates a duty cycle control signal LD_duty at a continuously high level. In some other examples, the signal generator 212 generates the duty cycle control signal LD_duty according to the M enable signals.

Figure 5:
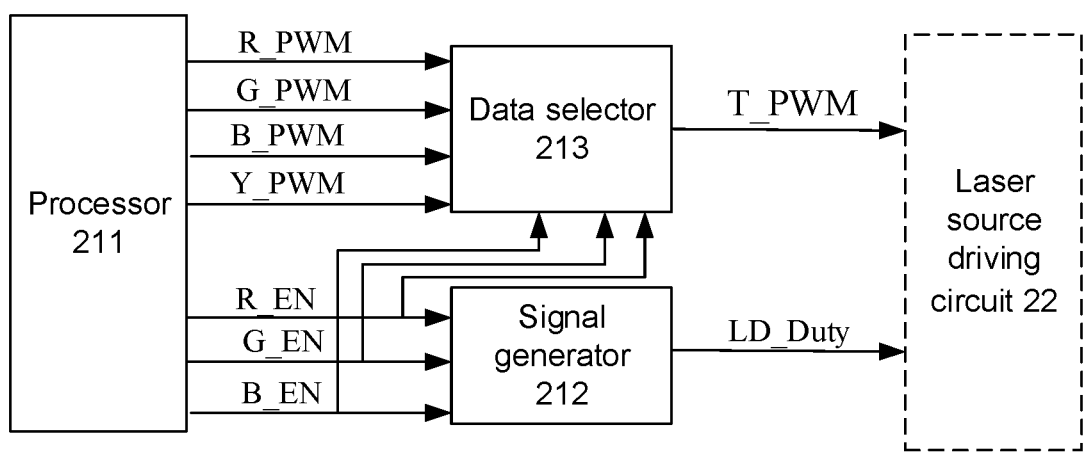
FIG. 5 is a schematic diagram of another display control circuit, in accordance with some embodiments of the present disclosure.

In some embodiments, as shown in FIG. 5, the processor 211 is further connected to the signal generator 212. The processor 211 is further configured to control signal generation of the signal generator 212, that is, the processor 211 is further configured to transmit the M enable signals to the signal generator 212. The signal generator 212 is configured to generate the duty cycle control signal according to the M enable signals.

Figure 6:
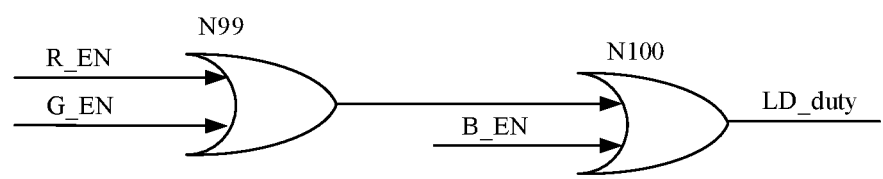
FIG. 6 is a circuit diagram of a signal generator, in accordance with some embodiments of the present disclosure.

In some embodiments, the duty cycle control signal LD_duty is generated by the signal generator 212 according to the M enable signals. Referring to FIG. 6, M is equal to 3 (M=3), and the signal generator 212 includes a first OR gate N99 and a second OR gate N100.

An OR gate is also referred to as an "OR circuit" or a logic "AND" circuit. The OR gate has a plurality of input terminals and one output terminal. As long as there is a high level (logic 1) in the input, the output is at a high level, otherwise the output is at a low level (logic 0).

Two input terminals of the first OR gate N99 are used to receive two of the three enable signals. One input terminal of the second OR gate N100 is connected to an output terminal of the first OR gate N99, the other input terminal of the second OR gate N100 is used to receive one of the three enable signals except the two enable signals, and an output terminal of the second OR gate N100 is used to output the duty cycle control signal LD_duty.

It will be noted that, FIG. 6 shows an example where the two input terminals of the first OR gate N99 receive the red enable signal R_EN and the green enable signal G_EN, and the other input terminal of the second OR gate N100 receives the blue enable signal B_EN, but an input sequence of the red enable signal R_EN, the green enable signal G_EN, and the blue enable signal B_EN is not limited.

In some embodiments, referring to FIG. 6, when potentials of the red enable signal R_EN, the green enable signal G_EN, and the blue enable signal B_EN are 1, 0, and 0, respectively, a potential of the duty cycle control signal LD_duty is 1; and when the potentials of the red enable signal R_EN, the green enable signal G_EN, and the blue enable signal B_EN are 1, 1 and 0, respectively, the potential of the duty ratio control signal LD_duty is 1.

For the convenience of description, subsequent embodiments will be described by taking an example where the duty cycle control signal LD_duty is generated by the signal generator according to the M enable signals, but the embodiments of the present disclosure do not limit a manner in which the duty cycle control signal LD_duty is generated.

In some embodiments, the processor 211 includes a signal output circuit. The signal output circuit is configured to output the N current control signals and the M enable signals.

Figure 7:
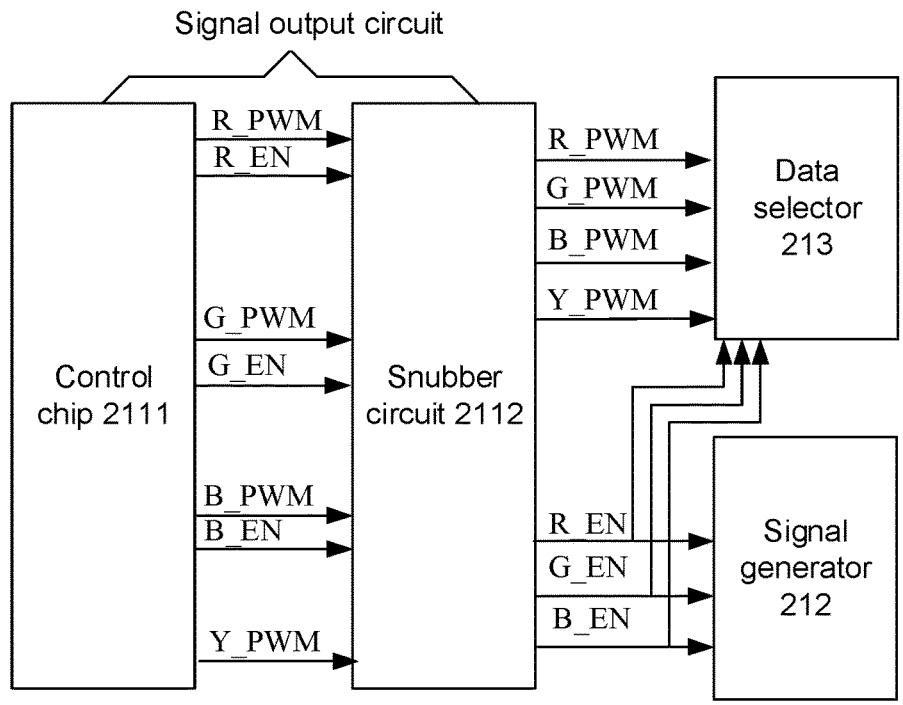
FIG. 7 is a schematic diagram of a signal output circuit, in accordance with some embodiments of the present disclosure.

In some embodiments, as shown in FIG. 7, the signal output circuit includes a control chip 2111 and a snubber circuit 2112 connected to the control chip 2111. The snubber circuit 2112 is further connected to the signal generator 212 and the data selector 213.

The control chip 2111 is configured to generate the N current control signals and the M enable signals corresponding to each of the plurality of frames of images and transmit the N current control signals and the M enable signals to the snubber circuit 2112.

The snubber circuit 2112 is configured to buffer each received current control signal and enable signal, output the each buffered current control signal to the data selector 213, and output the each buffered enable signal to the data selector 213 and the signal generator 212.

For example, the snubber circuit is also referred to as an absorption circuit, which is a protection circuit. The snubber circuit provided in the embodiments of the present disclosure may be a three-state buffer, which is also referred to as a three-state gate or a three-state driver. The three-state buffer has a three-state output terminal and an enable input terminal. The three-state output terminal is controlled by the enable input terminal. When a potential at the enable input terminal is an effective potential, the three-state output terminal is used for output of a normal logic state (e.g., the logic 0 or the logic 1). When the potential at the enable input terminal is an ineffective potential, output of the three-state output terminal is in a high-impedance state, which is equivalent to that the three-state output terminal is disconnected from a circuit connected thereto.

Figure 8:
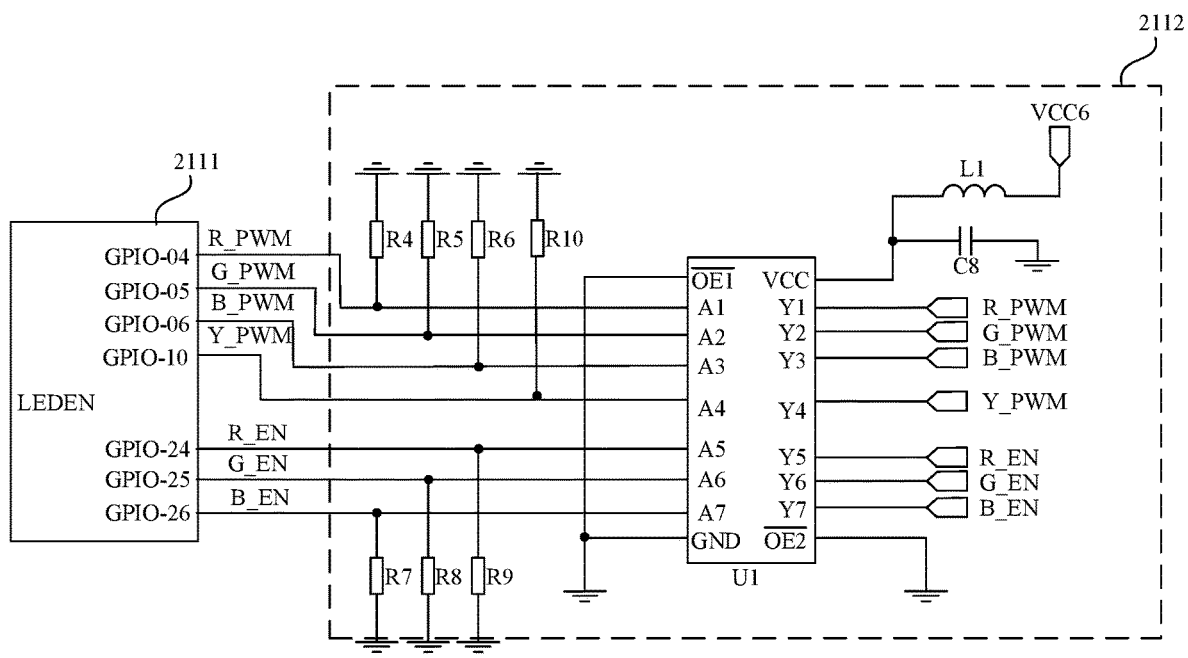
FIG. 8 is a circuit diagram of a snubber circuit, in accordance with some embodiments of the present disclosure.

In some embodiments, as shown in FIG. 8, the snubber circuit 2112 includes a buffer chip U1. For example, the four current control signals are the red PWM signal R_PWM, the green PWM signal G_PWM, the blue PWM signal B_PWM, and the hybrid-color PWM signal Y_PWM. The three enable signals are the red enable signal R_EN, the green enable signal G_EN, and the blue enable signal B_EN. In this case, the control chip 2111 may include a GPIO-04 pin for outputting the red PWM signal R_PWM, a GPIO-05 pin for outputting the green PWM signal G_PWM, a GPIO-06 pin for outputting the blue PWM signal B_PWM, a GPIO-10 pin for outputting the hybrid-color PWM signal Y_PWM, a GPIO-24 pin for outputting the red enable signal R_EN, a GPIO-25 pin for outputting the green enable signal G_EN, and a GPIO-26 pin for outputting the blue enable signal B_EN.

The Buffer chip U1 may include a total of seven input pins from an A1 pin to an A7 pin and a total of seven output pins from a Y1 pin to a Y7 pin. The Buffer chip U1 further includes a $\overline{OE1}$ pin, a GND pin, a VCC pin, and a $\overline{OE2}$ pin.

The A1 pin is connected to the GPIO-04 pin and a terminal of a resistor R4 and is used to receive the red PWM signal R_PWM provided by the control chip 2111. The A2 pin is connected to the GPIO-05 pin and a terminal of a resistor R5 and is used to receive the green PWM signal G_PWM provided by the control chip 2111. The A3 pin is connected to the GPIO-06 pin and a terminal of a resistor R6 and is used to receive the blue PWM signal B_PWM provided by the control chip 2111. The A4 pin is connected to the GPIO-10 pin and a terminal of a resistor R10 and is used to receive the hybrid-color PWM signal Y_PWM provided by the control chip 2111.

The A5 pin is connected to the GPIO-24 pin and a terminal of a resistor R9 and is used to receive the red enable signal R_EN provided by the control chip 2111. The A6 pin is connected to the GPIO-25 pin and a terminal of a resistor R8 and is used to receive the green enable signal G_EN provided by the control chip 2111. The A7 pin is connected to the GPIO-26 pin and a terminal of a resistor R7 and is used to receive the blue enable signal B_EN provided by the control chip 2111.

Another terminal of the resistor R4, another terminal of the resistor R5, another terminal of the resistor R6, another terminal of the resistor R10, another terminal of the resistor R7, another terminal of the resistor R8, another terminal of the resistor R9, the $\overline{OE1}$ pin, and the $\overline{OE2}$ pin are all grounded.

In some examples, as shown in FIG. 8, the VCC pin is connected to a terminal of an inductor L1 and a terminal of a capacitor C8. Another terminal of the inductor L1 is connected to a power supply terminal VCC6, and another terminal of the capacitor C8 is grounded. The inductor L1 and the capacitor C8 form a filter circuit for filtering out high frequency components and clutter in the circuit.

In some other examples, in a case where a signal of the power supply terminal VCC6 has a good quality, the VCC pin may be directly connected to the power supply terminal VCC6.

The Y1 pin is used to transmit a buffered red PWM signal R_PWM. The Y2 pin is used to transmit a buffered green PWM signal G_PWM. The Y3 pin is used to transmit a buffered blue PWM signal B_PWM. The Y4 pin is used to transmit a buffered hybrid-color PWM signal Y_PWM. The Y1 pin to the Y4 pin may all be directly or indirectly connected to the data selector 13.

The Y5 pin is used to transmit a buffered red enable signal R_EN. The Y6 pin is used to transmit a buffered green enable signal G_EN. The Y7 pin is used to transmit a buffered blue enable signal B_EN. The Y5 pin to the Y7 pin may be directly or indirectly connected to the data selector 213 and may further be directly or indirectly connected to the signal generator 212.

For example, a voltage provided by the power supply terminal VCC6 may be 3 V. Resistance values of the resistor R4 to the resistor R10 may all be 10 kΩ. A parameter of the capacitor C8 may be 100 nF/16 V, that is, the capacitor C8 has a capacitance of 100 nF and a working voltage (i.e., a withstand voltage) of 16 V. A model of the inductor L1 may be BLM15AG121SN1D.

The PWM signals and the enable signals transmitted by the control chip 2111 may be transmitted to a subsequent circuit through the snubber circuit, so that driving capabilities of the PWM signals and the enable signals transmitted to the subsequent circuit are enhanced, thereby ensuring a stable and efficient operation of the subsequent circuit.

In some embodiments, the control chip 2111 may be a digital light processing (DLP) chip. For example, the DLP chip may be a DLPC6421 chip or a DDP4422 chip.

In some embodiments, the data selector 213 includes a plurality of data input terminals, at least one logic pin, and an output pin. For example, the at least one logic pin may be one, two, or more logic pins. The plurality of data input terminals are configured to receive the N current control signals. The at least one logic pin is configured to receive the M enable signals. For example, a logic pin of the at least one logic pin is configured to receive an enable signal of the M enable signals. The output pin is configured to output the effective current control signal.

In some embodiments, N is equal to 4 (N=4), and M is equal to 3 (M=3), and the data selector 213 may be a 1-out-of-8 selector. For example, the four current control signals are the red PWM signal R_PWM, the green PWM signal G_PWM, the blue PWM signal B_PWM, and the hybrid-color PWM signal Y_PWM; and the three enable signals are the red enable signal R_EN, the green enable signal G_EN, and the blue enable signal B_EN.

Figure 9:
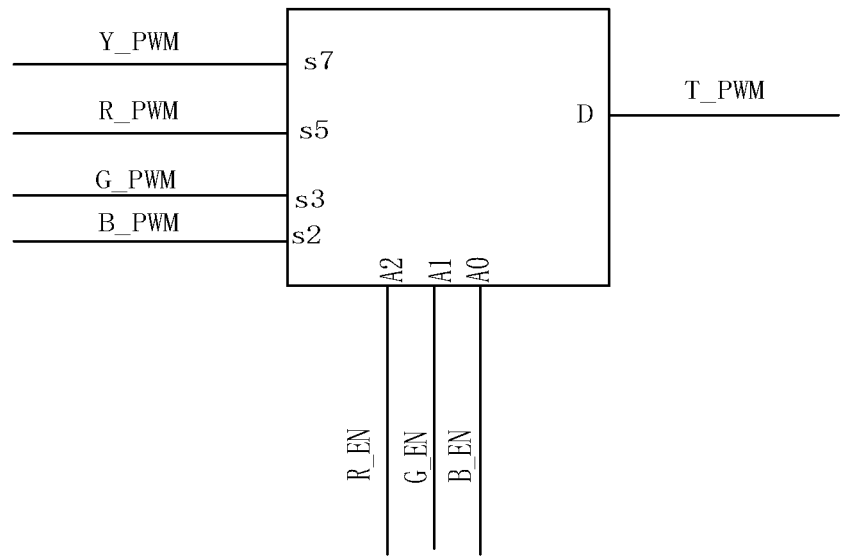
FIG. 9 is a schematic diagram of a signal selector, in accordance with some embodiments of the present disclosure.

In this case, as shown in FIG. 9, the data selector 213 has four data input terminals for receiving the four current control signals. The four data input terminals are a pin S5 for receiving the red PWM signal R_PWM (e.g., connected to the Y1 pin in the snubber circuit 2112 shown in FIG. 8), a pin S3 for receiving the green PWM signal G_PWM (e.g., connected to the Y2 pin in the snubber circuit 2112 shown in FIG. 8), a pin S2 for receiving the blue PWM signal B_PWM (e.g., connected to the Y3 pin in the snubber circuit 2112 shown in FIG. 8), and a pin S7 for receiving the hybrid-color PWM signal Y_PWM (e.g., connected to the Y4 pin in the snubber circuit 2112 shown in FIG. 8). The data selector 213 further has three logic pins for receiving the three enable signals. The three logic pins are a pin A2 for receiving the red enable signal R_EN (e.g., connected to the Y5 pin in the snubber circuit 2112 shown in FIG. 8), a pin A1 for receiving the green enable signal G_EN (e.g., connected to the Y6 pin in the snubber circuit 2112 shown in FIG. 8), and a pin A0 for receiving the blue enable signal B_EN (e.g., connected to the Y7 pin in the snubber circuit 2112 shown in FIG. 8). The data selector 213 further has an output pin D for outputting the effective current control signal T_PWM.

The data selector 213 is configured such that, if a potential of an enable signal corresponding to one of the M primary colors is an effective potential, and potentials of enable signals corresponding to the other primary colors in the M primary colors are ineffective potentials, a current control signal corresponding to the one primary color is used as the effective current control signal, and is output from the output pin; and, if potentials of enable signals corresponding to at least two of the M primary colors are effective potentials, the hybrid-color current control signal is used as the effective current control signal, and is output from the output pin D.

For example, referring to Table 1, an effective potential is represented as 1, an ineffective potential is represented as 0, and the effective current control signal output by the output pin is represented as T_PWM. The potentials of the red enable signal R_EN, the green enable signal G_EN, and the blue enable signal B_EN are 0, 1, and 0, respectively. That is, the potential of the green enable signal G_EN is an effective potential, and the potentials of the red enable signal R_EN and the blue-green enable signal B_EN are both ineffective potentials. In this case, the effective current control signal T_PWM is the green PWM signal G_PWM. The potentials of the red enable signal R_EN, the green enable signal G_EN, and the blue enable signal B_EN are 1, 1, and 0, respectively. That is, the potentials of the red enable signal R_EN and the green enable signal G_EN are both effective potentials, and the potential of the blue enable signal B_EN is an ineffective potential. In this case, the effective current control signal T_PWM is the hybrid-color PWM signal Y_PWM.

It will be noted that, Table 1 shows a case where the hybrid-color current control signal required to be output is a hybrid-color current control signal for controlling a current when the red color and the green color are simultaneously displayed, and there is no need to output a hybrid-color current control signal for controlling a current when the red color and the blue color are simultaneously displayed, a hybrid-color current control signal for controlling a current when the green color and the blue color are simultaneously displayed, and a hybrid-color current control signal for controlling a current when the red color, the blue color, and the green color are simultaneously displayed. In this case, although the red and blue enable signals, the green and blue enable signals, and the red, blue, and green enable signals meet conditions for obtaining the effective current control signal, the hybrid-color current control signal for controlling the current when the red color and the blue color are simultaneously displayed, the hybrid-color current control signal for controlling the current when the green color and the blue color are simultaneously displayed, and the hybrid-color current control signal for controlling the current when the red color, the blue color, and the green color are simultaneously displayed are not output; thus, positions corresponding to the "effective current control signal" in the Table 1 are "none".

Contents of the Table 1 may be expressed in a simplified manner in actual use. For example, the potentials of the red enable signal R_EN, the green enable signal G_EN, and the blue enable signal B_EN are 1, 0, and 0, respectively, which may be expressed as EN_R:EN_G:EN_B=1:0:0.

TABLE 1

| Enable signal | | | Effective current control signal |
| --- | --- | --- | --- |
| R_EN | G_EN | B_EN | T_PWM |
| 0 | 0 | 1 | B_PWM |
| 0 | 1 | 0 | G_PWM |
| 1 | 0 | 0 | R_PWM |
| 0 | 1 | 1 | None |
| 1 | 0 | 1 | None |
| 1 | 1 | 0 | Y_PWM |
| 1 | 1 | 1 | None |
| 0 | 0 | 0 | None |

Figure 10:
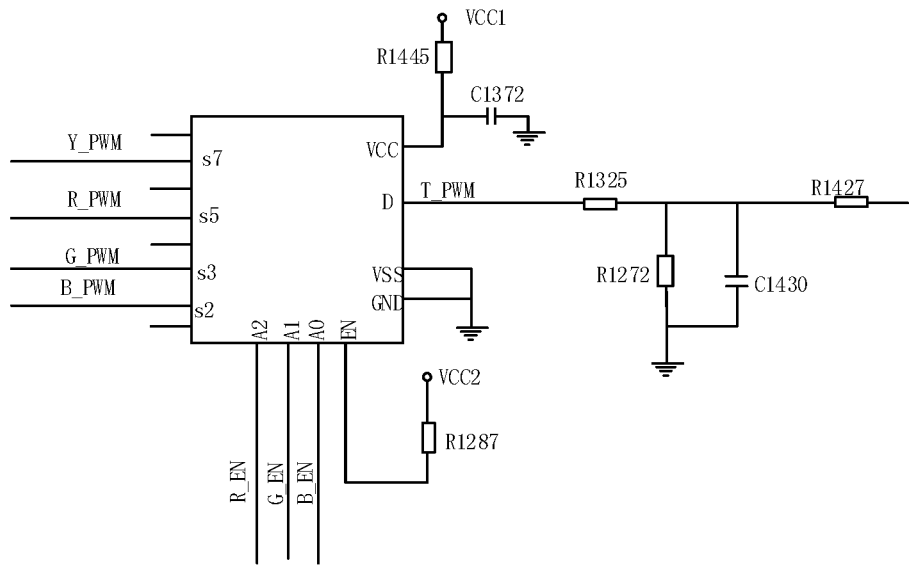
FIG. 10 is a circuit diagram of a control chip, in accordance with some embodiments of the present disclosure.

It will be noted that, according to actual usage, the control chip 2111 further includes other pins. For example, as shown in FIG. 10, the control chip further includes a power supply pin VCC, a first ground pin GND, a second ground pin VSS, and an enable pin EN. The power supply pin VCC is electrically connected to a first power supply terminal VCC1. The enable pin EN is electrically connected to a second power supply terminal VCC2. The first ground pin GND and the second ground pin VSS are both grounded.

In some examples, referring to FIG. 10, the display control circuit 21 further includes a first resistor R1445 and a first capacitor C1372. The first resistor R1445 is connected in series between the power supply pin VCC and the first power supply terminal VCC1. A terminal of the first capacitor C1372 is connected to a terminal of the first resistor R1445 connected to the power supply pin VCC, and another terminal of the first capacitor C1372 is grounded. The first resistor R1445 and the first capacitor C1372 form a filter circuit, which is used to filter high frequency components and clutter in the circuit.

In some other examples, if a signal of the first power supply terminal VCC1 has a good quality, the VCC pin may further be directly connected to the first power supply terminal VCC1.

In some embodiments, referring to FIG. 10, the display control circuit 21 further includes a second resistor R1287. The second resistor R1287 is connected in series between the enable pin EN and the second power supply terminal VCC2.

In some embodiments, referring to FIG. 10, the display control circuit 21 further includes a third resistor R1325, a fourth resistor R1427, a fifth resistor R1272, and a second capacitor C1430.

The third resistor R1325 and the fourth resistor R1427 are connected in series. A terminal of the third resistor R1325 and the fourth resistor R1427 that are connected in series is connected to the output pin D, and another terminal thereof is used to output a modulated effective current control signal T_PWM. For example, the another terminal is connected to the data selector 213.

The fifth resistor R1272 and the second capacitor C1430 are connected in parallel. A terminal of the parallel fifth resistor R1272 and the second capacitor C1430 that are connected in parallel is connected between the third resistor R1325 and the fourth resistor R1427, and another terminal thereof is grounded. The fifth resistor R1272 is a pull-down resistor, which is used to pull down a potential at the output pin D to a low potential when the output pin D does not output the signal, so as to ensure that the hybrid-color PWM signal Y_PWM is at a low level when the output pin D does not output the signal. The second capacitor C1430 is a filter capacitor for filtering out spikes and ripples of the hybrid-color PWM signal Y_PWM.

In some embodiments, the first resistor R1445, the third resistor R1325, and the fourth resistor R1427 may be zero-ohm resistors. Positions of the first resistor R1445, the third resistor R1325, and the fourth resistor R1427 may be selectively set according to actual conditions. For example, in a case where there is a test requirement for connection nodes between some circuit elements in the data selector 213, the first resistor R1445, the third resistor R1325, and the fourth resistor R1427 are connected in series at corresponding positions to facilitate testing.

It will be noted that the data selector 213 in FIG. 10 further includes other pins. For example, the data selector 213 may include sixteen pins, and pins except the above pins are all idle pins or pins for achieving other functions. The embodiments of the present disclosure do not limit this.

In some examples, a resistance value of the second resistor R1287 may be 3.3 kΩ, a resistance value of the fifth resistor R1272 may be 10 kΩ, and a capacitance of the first capacitor C1372 is 100 nF. Working voltages of the second resistor R1287, the fifth resistor R1272, and the first capacitor C1372 are all 16 V. A voltage of the second power supply terminal VCC2 is 5 V.

Figure 11:
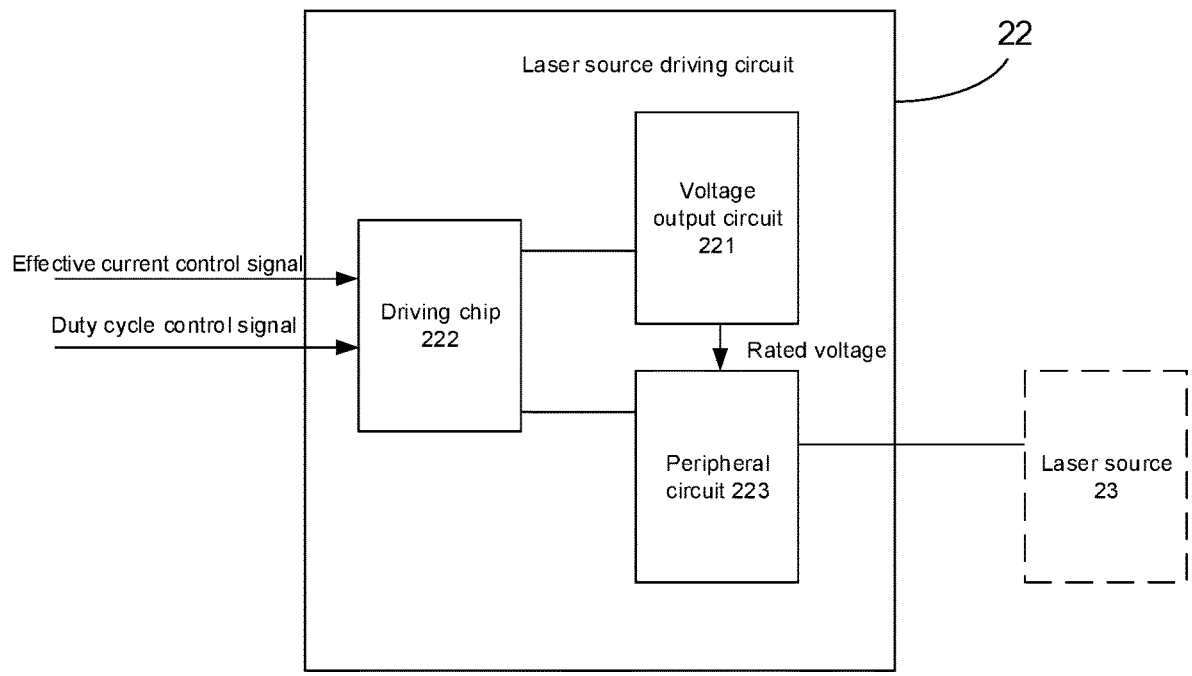
FIG. 11 is a schematic diagram of a laser source driving circuit, in accordance with some embodiments of the present disclosure.

In some embodiments, as shown in FIG. 11, the laser source driving circuit 22 includes a voltage output circuit 221, a driving chip 222, and a peripheral circuit 223. The peripheral circuit 223 is connected to the voltage output circuit 221 and the driving chip 222.

The voltage output circuit 221 is configured to provide a rated voltage of the laser source 23 to the peripheral circuit 223.

The driving chip 222 is configured to receive the effective current control signal, to provide a current corresponding to the effective current control signal to the peripheral circuit 223, receive the duty cycle control signal, and control the peripheral circuit 223 to be turned on and off according to the duty cycle control signal.

The peripheral circuit 223 is configured to provide the current corresponding to the effective current control signal to the laser source 23 according to the rated voltage when it is turned on.

The laser source driving circuit 22 is applicable to various mono-color laser sources. For different laser sources, structures of the driving chip, the voltage output circuit and the peripheral circuit in the laser source driving circuit 22 are different. For example, the voltage output circuit may be classified into a step-up circuit and a step-down circuit according to working mode. The step-up circuit is a circuit capable of stepping up an input voltage Vi to the rated voltage Vo of the laser source, and Vi is less than Vo (Vi<Vo). The step-down circuit is a circuit capable of stepping down the input voltage Vi to the rated voltage Vo of the laser source, and Vi is less than Vo (Vi>Vo). In this case, the voltage output circuit in the embodiments of the present disclosure may be the step-up circuit or the step-down circuit.

Figure 12:
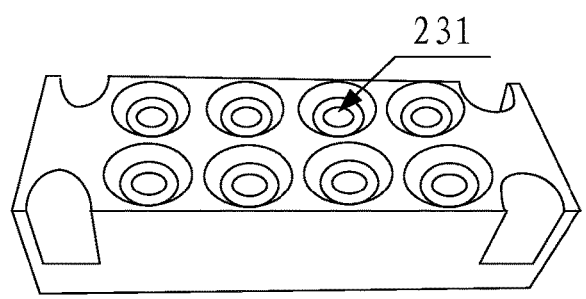
FIG. 12 is a schematic diagram of a bank laser, in accordance with some embodiments of the present disclosure.

In some embodiments, the laser source 23 includes laser(s) and is also referred to as a bank laser source (bank being an encapsulation method), and the voltage output circuit is the step-down circuit. The bank laser source may include one or more bank lasers. In a case where the bank laser source includes a plurality of bank lasers, the plurality of bank lasers are connected in series. As shown in FIG. 12, each bank laser may include a plurality of transistor outlines (TOs) 231 connected in series.

For example, as shown in FIG. 12, a bank laser may be encapsulated with eight TOs.

It will be noted that the bank laser(s) are provided according to actual conditions, and the numbers of the bank laser(s) required in different actual conditions are different. For example, the number of the bank laser(s) may be one, two, or more. In this way, it may be possible to enable the laser projection apparatus to achieve brightnesses required for different projection sizes.

In some examples, the driving chip 222 may include at least one processing module. For example, the driving chip 222 may include one, two, or more processing modules. Each processing module may be configured to control one laser. In a case where the driving chip 222 includes a plurality of processing modules, structures of the processing modules are the same.

Figure 13:
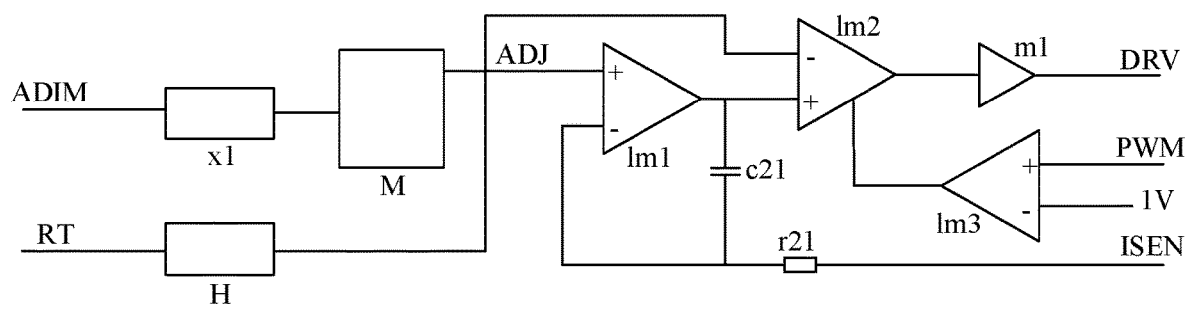
FIG. 13 is a schematic diagram of a processing module, in accordance with some embodiments of the present disclosure.

In some examples, the structure of each processing module may be as shown in FIG. 13. The processing module may include: a divider x1, a switching frequency square wave generator H, a voltage filter M, a first comparator lm1, a second comparator lm2, a third comparator lm3, a snubber m1, a resistor r21, and a capacitor c21. The processing module has a first pin ADIM, a second pin RT, a third pin DRV, a fourth pin PWM, and a fifth pin ISEN. For example, as shown in FIG. 13, the processing module has the first pin ADIM configured to receive the effective current control signal T_PWM, and the second pin RT configured to receive the duty cycle control signal LD_Duty. The processing module further has the third pin DRV, the fourth pin PWM, and the fifth pin ISEN.

The first pin ADIM of the processing module may be connected to a terminal of the divider x1. The divider x1 is configured to divide a signal transmitted by the first pin ADIM (e.g., the first pin ADIM being connected to the output pin D of the data selector shown in FIG. 9, and the signal transmitted by the first pin ADIM being the effective current control signal T_PWM) by ten. Another terminal of the divider x1 is connected to a terminal of the voltage filter M. The voltage filter M is configured to determine a positive input signal ADJ according to a voltage of a signal output by the divider x1. The voltage filter M is used to limit a voltage of the positive input signal ADJ so that the voltage of the positive input signal ADJ is less than or equal to a preset upper limit voltage. In a case where the voltage of the signal output by the divider x1 is less than or equal to the upper limit voltage set in the voltage filter M, for example, the upper limit voltage is 300 mV, the positive input signal ADJ output by the voltage filter M is the signal output by the divider x1; and in a case where the voltage of the signal output by the divider x1 is greater than the upper limit voltage, the voltage of the positive input signal ADJ output by the voltage filter M is the upper limit voltage. As a result, it is possible to ensure that the voltage of the positive input signal ADJ is less than or equal to the upper limit voltage and prevent a subsequent circuit (e.g., the first comparator lm1) from damage caused by an excessively large voltage of the positive input signal ADJ.

The first comparator lm1 and the third comparator lm3 each have a total of two input terminals, i.e., a positive input terminal and a negative input terminal, and an output terminal. The second comparator lm2 has a total of three input terminals, i.e., a positive input terminal, a negative input terminal, and an enable input terminal, and an output terminal.

In some examples, as shown in FIG. 13, the positive input terminal of the first comparator lm1 is connected to another terminal of the voltage filter M. The negative input terminal of the first comparator lm1 is connected to a terminal of the resistor r21 and a terminal of the capacitor c21, and another terminal of the resistor r21 is connected to the fifth pin ISEN. The output terminal of the first comparator lm1 may be connected to another terminal of the capacitor c21. The first comparator lm1 is used to compare magnitudes of voltages of the positive input terminal and the negative input terminal thereof. In a case where the voltage of the positive input terminal of the first comparator lm1 is greater than the voltage of the negative input terminal (i.e., a product of a driving current of the fifth pin ISEN and a resistance value of the resistor r21), a logic value output by the first comparator lm1 is 1. In a case where the voltage of the positive input terminal of the first comparator lm1 is less than the voltage of the negative input terminal, a logic value output by the first comparator lm1 is 0.

In some examples, as shown in FIG. 13, the positive input terminal of the second comparator lm2 is connected to the output terminal of the first comparator lm1. The negative input terminal of the second comparator lm2 is connected to a terminal of the switching frequency square wave generator H, and another terminal of the switching frequency square wave generator H is connected to the second pin RT. The enable input terminal of the second comparator lm2 is connected to the output terminal of the third comparator lm3. The output terminal of the second comparator lm2 is connected to a terminal of the snubber m1, and another terminal of the snubber m1 is connected to the third pin DRV. The switching frequency square wave generator H is configured to generate a square wave at a specified switching frequency. The square wave is transmitted to the third pin DRV through the first comparator lm1 and the second comparator lm2 and is output by the third pin DRV. The square wave output by the third pin DRV may be referred to as a driver (DRV) square wave. The switching frequency of the DRV square wave output by the third pin DRV is unchanged relative to the switching frequency of the square wave generated by the switching frequency square wave generator H. The switching frequency of the switching frequency square wave generator H may be related to a resistance value of a resistor externally connected thereto. For example, referring to FIG. 14, a resistor R904 is connected to the second pin RT. In this case, the switching frequency square wave generator H is connected to the resistor R904, and then the switching frequency of the switching frequency square wave generator H may be obtained according to a resistance value of the resistor R904.

The second comparator lm2 is configured to compare magnitudes of voltages of the positive input terminal and the voltage of the negative input terminal thereof when a level of the enable input terminal thereof is an effective level. For example, in a case where the voltage of the positive input terminal of the second comparator lm2 is greater than the voltage of the negative input terminal, a logic value output by the second comparator lm2 is 1; and in a case where the voltage of the positive input terminal of the second comparator lm2 is less than the voltage of the negative input terminal, a logic value output by the second comparator lm2 is 0.

In some examples, as shown in FIG. 13, the positive input terminal of the third comparator lm3 is connected to the fourth pin PWM, and the negative input terminal of the third comparator lm3 is connected to a direct current (DC) power supply terminal. For example, a voltage of the DC power supply terminal may be 1 V. The third comparator lm3 is configured to compare magnitudes of voltages of the positive input terminal and the negative input terminal thereof. For example, in a case where the voltage of the positive input terminal of the third comparator lm3 is greater than the voltage of the negative input terminal, a logic value output by the third comparator lm3 is 1; and in a case where the voltage of the positive input terminal of the third comparator lm3 is less than the voltage of the negative input terminal, a logic value output by the third comparator lm3 is 0.

It will be noted that, in the laser source driving circuit 22, each electronic component connected to the processing module may be a component in the peripheral circuit 223.

In some embodiments, the driving chip 222 includes a plurality of processing modules. The driving chip 222 is configured to control a plurality of lasers. As shown in FIG. 13, each processing module may include the first pin ADIM, the second pin RT, the third pin DRV, the fourth pin PWM, and the fifth pin ISEN. The plurality of processing modules may share the first pin ADIM and the second pin RT. For example, referring to FIG. 14, the driving chip 222 is used to control two lasers, which are a first laser and a second laser, and then the driving chip 222 may include two processing modules, which are a first processing module corresponding to the first laser and a second processing module corresponding to the second laser.

The first laser and the second laser may be provided in various manners. In some examples, the first laser and the second laser may each be a bank laser. In some other examples, one of the first laser and the second laser is a bank laser, and the other is two bank lasers connected in series.

The two processing modules share the first pin ADIM and the second pin RT. The first processing module of the two processing modules has a third pin DRV1, a fourth pin PWM1, and a fifth pin ISEN1; and the second processing module has a third pin DRV2, a fourth pin PWM2, and a fifth pin ISEN2.

In some embodiments, the driving chip 222 further includes a power supply pin VCC, a sixth pin BLON, a seventh pin VREF, and a ground pin GND. The power supply pin VCC is configured to supply power to the driving chip 222. For example, a power supply voltage may be 12 V. The sixth pin BLON is configured to control the driving chip 222 to be turned on and off. The seventh pin VREF is configured to transmit a reference voltage internally generated by the driving chip 222. For example, the reference voltage may be 6 V. The ground pin GND is grounded. The peripheral circuit may include a positive output port LD1+ and a negative output port LD1− that correspond to the first processing module and a positive output port LD2+ and a negative output port LD2− that correspond to the second processing module.

The first pin ADIM of the driving chip 222 may be connected to the data selector 213 through a voltage divider resistor. For example, the first pin ADIM of the driving chip 222 may be connected to the output pin D of the data selector 213 shown in FIG. 9 or 10. The driving chip 222 is configured to receive the effective current control signal T_PWM provided by the data selector 213.

Figure 14:
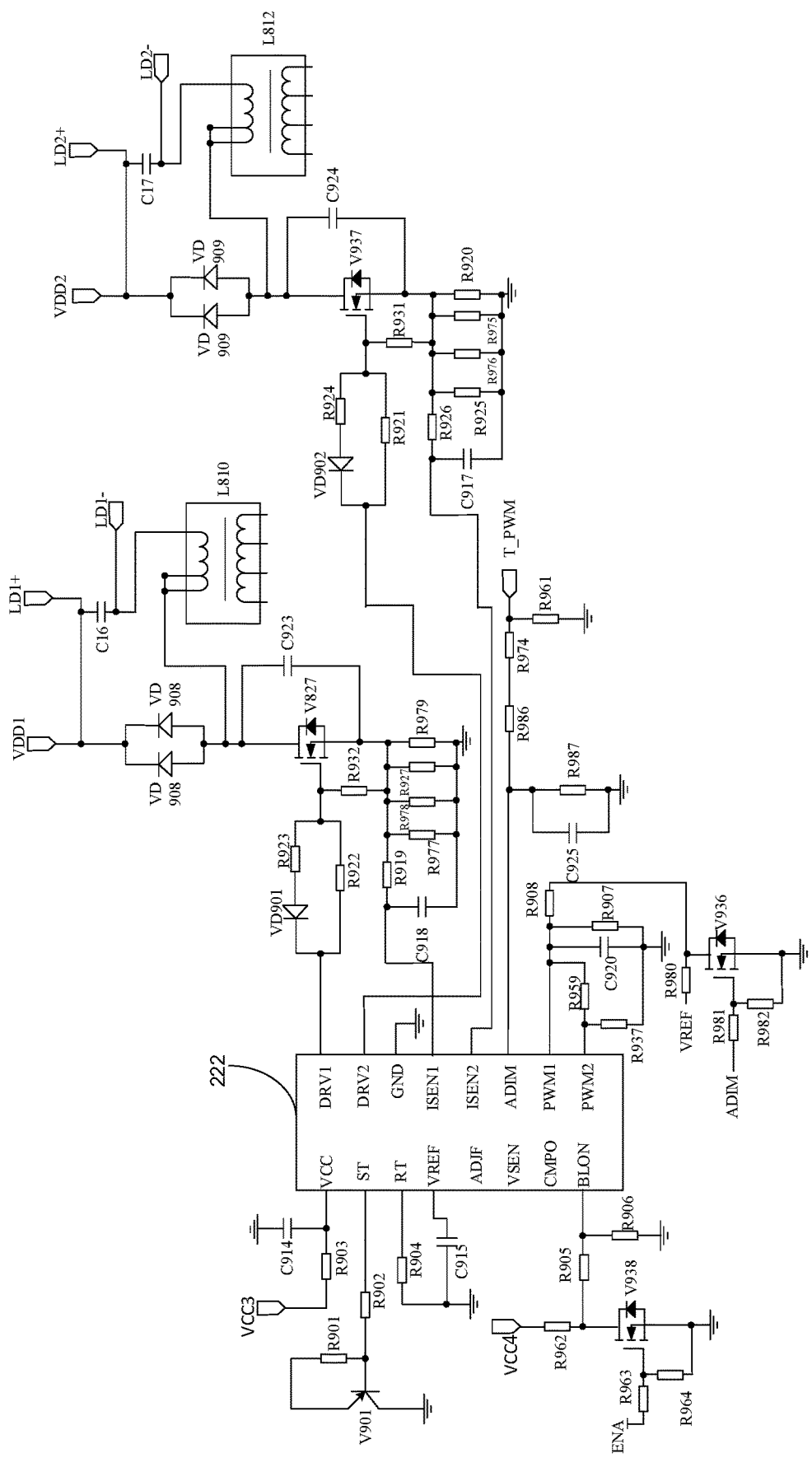
FIG. 14 is a circuit diagram of a laser source driving circuit, in accordance with some embodiments of the present disclosure.

In some embodiments, as shown in FIG. 14, the first pin ADIM of the driving chip 222 may be connected to a terminal of a resistor R987 and a terminal of a resistor R986. Another terminal of the resistor R987 is grounded, and a capacitor C925 and the resistor R987 are connected in parallel. Another terminal of the resistor R986 is connected to a terminal of a resistor R974. Another terminal of the resistor R974 is connected to the data selector 213 (e.g., the output pin D). The resistor R974 is configured to receive the effective current control signal T_PWM provided by the data selector 213. The another terminal of the resistor R974 is further connected to a terminal of a resistor R961, and another terminal of the resistor R961 is grounded. The resistor R961 is a pull-down resistor, and the resistors R986, R974 and R987 are voltage divider resistors. The capacitor C925 is a filter capacitor, which is configured to perform high-frequency filter to block high-frequency clutter in the circuit.

In some embodiments, the fifth pin ISEN of each processing module may be connected to a sampling resistor. For example, referring to FIG. 14, the fifth pin ISEN1 of the first processing module may be connected to a terminal of a first sampling resistor through a resistor R919. The terminal of the first sampling resistor is further connected to the negative output port LD1−, and the fifth pin ISEN1 of the first processing module may be connected to another terminal of the first sampling resistor through a capacitor C918. The another terminal of the first sampling resistor is further grounded. The first sampling resistor may include one or more resistors. In a case where the first sampling resistor includes a plurality of resistors, the plurality of resistors may be connected in parallel to obtain a required resistance value, so as to meet a current adjustment requirement of the laser source driving circuit, and to ensure an accurate adjustment of a current of the laser source driving circuit. For example, referring to FIG. 14, the first sampling resistor may include a resistor R977, a resistor R978, a resistor R927, and a resistor R979 that are connected in parallel. The first processing module may detect a driving current of the corresponding laser through the first sampling resistor.

In some embodiments, referring to FIG. 14, the fifth pin ISEN2 of the second processing module may be connected to a terminal of a second sampling resistor through a resistor R926. The terminal of the second sampling resistor is further connected to the negative output port LD2−, and the fifth pin ISEN2 of the second processing module may be connected to another terminal of the second sampling resistor through a capacitor C917. The another terminal of the second sampling resistor is further grounded. The second sampling resistor may include one or more resistors. In a case where the second sampling resistor includes a plurality of resistors, the plurality of resistors may be connected in parallel to obtain a required resistance value, so as to meet the current adjustment requirement of the laser source driving circuit, and to ensure the accurate adjustment of the current of the laser source driving circuit. For example, referring to FIG. 14, the second sampling resistor may include a resistor R925, a resistor R976, a resistor R975, and a resistor R920 that are connected in parallel. The second processing module may detect a driving current of the corresponding laser through the second sampling resistor.

In some embodiments, as shown in FIG. 14, the third pin DRV1 of the first processing module may be connected to a switching transistor V827. For example, the third pin DRV1 of the first processing module may be connected to a gate of the switching transistor V827. A source of the switching transistor V827 is connected to the terminal of the first sampling resistor and a terminal of a transformer L810. Another terminal of the transformer L810 is connected to the negative output port LD1−. A drain of the switching transistor V827 is connected to a power supply terminal VDD1. A signal output by the third pin DRV1 of the first processing module may control a turned-on state and a turned-off state of the switching transistor V827, so that the switching transistor V827 connects the power supply terminal VDD1 to the terminal of the transformer L810 in the turn-on state, and an output voltage of the negative output port LD1− is changed through the transformer L810, and the another terminal of the transformer L810 is not connected to other terminals. For example, the switching transistor may be a metal oxide semiconductor field effect transistor (MOSFET).

In some embodiments, as shown in FIG. 14, the third pin DRV1 of the first processing module may be connected to a terminal of a diode VD901 and a terminal of a resistor R922. Another terminal of the diode VD901 is connected to a terminal of a resistor R923. Another terminal of the resistor R922 and another terminal of the resistor R923 are both connected to the gate of the switching transistor V827, and the another terminal of the resistor R922 and the another terminal of the resistor R923 are further both connected to the terminal of the first sampling resistor through a resistor R932. The drain of the switching transistor V827 may be connected to the power supply terminal VDD1 through two diodes VD908 connected in parallel. The source of the switching transistor V827 may be connected to the transformer L810 through a capacitor C923. A capacitor C16 is further connected in series between the positive output port LD1+ and the negative output port LD1− corresponding to the first processing module. The capacitor C16 is a step-down capacitor. When the power supply terminal VDD1 supplies power, the capacitor C16 is continuously charged. When the power supply terminal VDD1 stops supplying power, the capacitor C16 continuously discharges electricity.

In some examples, the capacitor C16 may include one or more capacitors. In a case where the capacitor C16 includes a plurality of capacitors, the plurality of capacitors are connected in parallel, so that a required capacitance may be obtained through the plurality of capacitors connected in parallel. As a result, it may be possible to meet the current adjustment requirement of the laser source driving circuit and to ensure the accurate adjustment of the current of the laser source driving circuit. For example, the capacitor C16 may include four capacitors connected in parallel.

In some embodiments, as shown in FIG. 14, the third pin DRV2 of the second processing module may be connected to a switching transistor V937. For example, the third pin DRV2 of the second processing module may be connected to a gate of the switching transistor V937. A source of the switching transistor V937 is connected to a terminal of the second sampling resistor and a terminal of a transformer L812. Another terminal of the transformer L812 is connected to the negative output port LD2−. A drain of the switching transistor V937 is connected to a power supply terminal VDD2. A signal output by the third pin DRV2 of the second processing module may control a turned-on state and a turned-off state of the switching transistor V937, so that the switching transistor V937 connects the power supply terminal VDD2 to the terminal of the transformer L812 in the turned-on state, and an output voltage of the negative output port LD2− is changed through the transformer L812. For example, the switching transistor may be a MOSFET.

In some embodiments, as shown in FIG. 14, the third pin DRV2 of the second processing module may be connected to a terminal of a diode VD902 and a terminal of a resistor R921. Another terminal of the diode VD902 is connected to a terminal of a resistor R924. Another terminal of the resistor R924 and another terminal of the resistor R921 are both connected to the gate of the switching transistor V937, and the another terminal of the resistor R921 and the another terminal of the resistor R924 are further both connected to the terminal of the second sampling resistor through a resistor R931. The drain of the switching transistor V937 may be connected to the power supply terminal VDD2 through two diodes VD909 connected in parallel. The source of the switching transistor V937 may be connected to the transformer L812 through a capacitor C924. A capacitor C17 is further connected in series between the positive output port LD2+ and the negative output port LD2− corresponding to the second processing module.

In some examples, the capacitor C17 is a step-down capacitor. When the power supply terminal VDD2 supplies power, the capacitor C17 is continuously charged. When the power supply terminal VDD2 stops supplying power, the capacitor C17 continuously discharges electricity. For example, the capacitor C17 may include one or more capacitors. In a case where it includes a plurality of capacitors, the plurality of capacitors are connected in parallel, so that a required capacitance may be obtained through the plurality of capacitors connected in parallel. As a result, it may be possible to meet the current adjustment requirement of the laser source driving circuit and to ensure the accurate adjustment of the current of the laser source driving circuit. For example, the capacitor C17 may include four capacitors connected in parallel.

In some embodiments, as shown in FIG. 14, the fourth pin PWM1 of the first processing module is connected to a terminal of a resistor R908 and a terminal of a resistor R959. Another terminal of the resistor R908 is connected to a terminal of a resistor R980 and a source of a switching transistor V936. The fourth pin PWM2 of the second processing module is connected to a terminal of a resistor R937 and another terminal of the resistor R959. A capacitor C920 and a resistor R907 are connected in parallel. A terminal of the capacitor C920 and the resistor R907 that are connected in parallel is connected to the terminal of the resistor R908, and another terminal of the capacitor C920 and the resistor R907 that are connected in parallel is connected to another terminal of the resistor R937. Another terminal of the resistor R980 is connected to the seventh pin VREF. The resistor R980 is configured to receive the reference voltage. A gate of the switching transistor V936 is connected to the first pin ADIM through a resistor R981. A terminal of a resistor R982 is connected to the gate of the switching transistor V936, and another terminal of the resistor R982 is grounded. The seventh pin VREF is connected to a terminal of a capacitor C915, and another terminal of the capacitor C915 is grounded.

The resistor R907 and the resistor R937 are pull-down resistors. The resistor R907 is configured to pull down a level of the fourth pin PWM1 when there is no signal of the first pin ADIM, and the resistor R937 is configured to pull down a level of the fourth pin PWM2 when there is no signal of the first pin ADIM, so as to ensure that effective current control signals T_PWM of the fourth pins PWM1 and PWM2 are both at low levels when there is no signal of the first pin ADIM. The resistor R959 is a zero-ohm resistor, and a position thereof may be selectively set according to actual conditions. In a case where there is a test requirement in the circuit, the resistor may be connected in series at a corresponding position to facilitate debugging. The resistor R959 may connect the fourth pins PWM1 and PWM2 together, and the resistor R959 is controlled by the first pin ADIM. The resistor R982 is a pull-down resistor and is configured to pull down a level of the first pin ADIM when there is no signal of the first pin ADIM, so as to ensure that the effective current control signal T_PWM is at a low level when there is no signal of the first pin ADIM. When the signal of the first pin ADIM is at a high level, the switching transistor V936 is turned on and grounded, at which time signals entering the fourth pins PWM1 and PWM2 are at low levels. When the signal of the first pin ADIM is at a low level, the switching transistor V936 is turned off, the seventh pin VREF is connected to the fourth pins PWM1 and PWM2 through the resistor R980, and a signal of the seventh pin VREF is at a high level. In this way, by controlling on and off of the switching transistor V936, the signals input to the fourth pins PWM1 and PWM2 are made to be inverted from the effective current control signal T_PWM provided by the signal of the first pin ADIM.

The second pin RT of the driving chip 222 may be connected to a terminal of the resistor R904, and another terminal of the resistor R904 is grounded.

As shown in FIG. 14, a terminal of a resistor R903 is connected to a power supply terminal VCC3, and another terminal thereof is connected to the power supply pin VCC of the driving chip 222. A terminal of a capacitor C914 is connected to the power supply pin VCC, and another terminal thereof is grounded. The resistor R903 and the capacitor C914 form a low-pass filter for performing low-frequency filter to block high-frequency clutter in the circuit.

In some embodiments, as shown in FIG. 14, the driving chip 222 may further include an eighth pin ST. The eighth pin ST of the driving chip 222 may be connected to a terminal of a resistor R902. Another terminal of the resistor R902 is connected to a terminal of a resistor R901 and a base electrode of a triode V901. Another terminal of the resistor R901 is connected to an emitter of the triode V901. A collector of the triode V901 is grounded. A circuit connected to the eighth pin ST is a protection circuit. When the laser source driving circuit works abnormally, an error reporting signal may be output through the eighth pin ST to trigger a protection mechanism of the laser source driving circuit. For example, the laser source or an overall power supply may be turned off to implement the protection mechanism.

As shown in FIG. 14, the sixth pin BLON is connected to a terminal of a resistor R905 and a terminal of the resistor R906. Another terminal of the resistor R906 is grounded. Another terminal of the resistor R905 is connected to a terminal of a resistor R962 and a source of a switching transistor V938. A gate of the switching transistor V938 is connected to a terminal of a resistor R963 and a terminal of a resistor R964. Another terminal of the resistor R963 is configured to receive a lighting enable signal ENA. Another terminal of the resistor R964 are a drain of the switching transistor V938 are grounded. When a signal of the sixth pin BLON is at a high level, the driving chip 222 works in response to the high level signal. When the signal of the sixth pin BLON is at a low level, the driving chip 222 stops working in response to the low level signal. The peripheral circuit including the switching transistor V938 connected to the sixth pin BLON is configured to achieve inversion of the lighting enable signal ENA. The driving chip 222 is configured to work and stop working in response to the lighting enable signal ENA.

In some embodiments, the lighting enable signal ENA is generated by a chip except the driving chip 222. For example, referring to FIG. 8, the control chip 2111 further has a lighting pin LEDEN. The lighting enable signal ENA may be generated by the control chip 2111 and output through the lighting pin LEDEN of the control chip 2111.

It will be noted that, the above switching transistors (the switching transistor V936 and the switching transistor V938) for the signal inversion are optional components according to actual design logic. They are selectively set according to front-end design logic and back-end design in circuits where they are located, so as to match the front-end design logic and the back-end design. For example, a signal output by the display control circuit 21 is inverted and then input to a back-end laser source driving circuit 22, and the inverted signal needs to be inverted and adjusted to the signal actually output by the display control circuit 21 before entering the driving chip 222.

Figure 15:
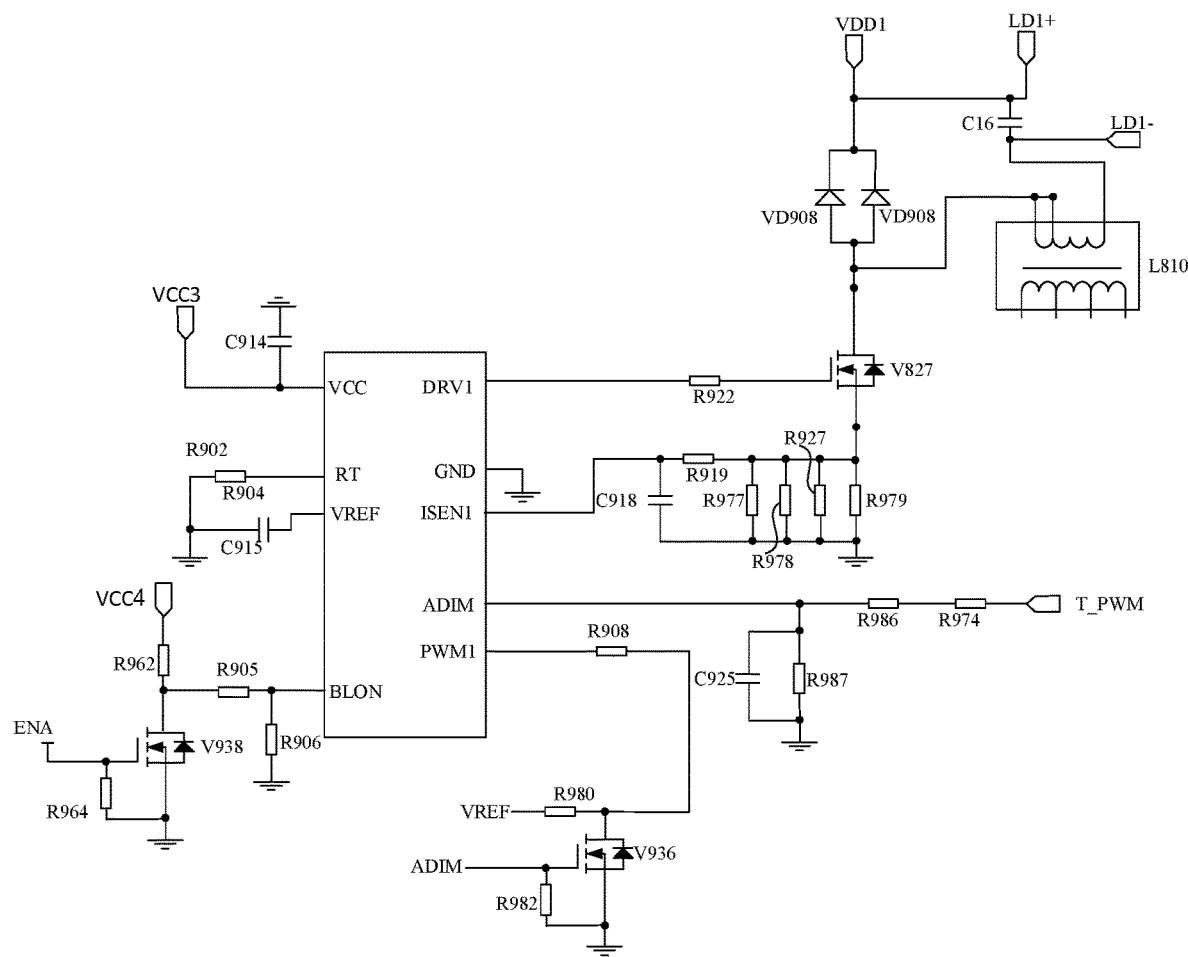
FIG. 15 is a circuit diagram of a step-down circuit, in accordance with some embodiments of the present disclosure.

FIG. 15 is a circuit diagram of a step-down circuit, in accordance with some embodiments of the present disclosure, and takes a step-down circuit connected to the first processing module as an example for illustration. For functions of respective pins and components in FIG. 15, reference may be made to the detailed description of the functions of the respective pins and components in FIG. 14 described above, and details will not be repeated herein.

For example, referring to FIGS. 14 and 15, two bank lasers are connected in series, and a working current is 3 A. A voltage consumed by each bank laser is 34 V, and thus the two bank lasers connected in series need a rated voltage of 68 V to work normally. A voltage provided by the power supply terminal VDD1 may be 76 V, and a voltage provided by the power supply terminal VDD2 may be 38 V. A resistance value of the resistor R905 is 1 kΩ. A voltage of the power supply terminal VCC3 and a voltage of a power supply terminal VCC4 may be 12 V.

Referring to FIGS. 13 and 14, the resistor R987, the resistor R986, and the resistor R974 are the voltage divider resistors, and are able to divide a voltage of the effective current control signal T_PWM provided by the data selector 213, so that a voltage-divided analog signal is input to the first pin ADIM of the driving chip 222. The driving chip 222 adjusts a driving current of the laser source according to an input voltage $U_{ADIM}$ of the first pin ADIM. Considering any laser in the laser source as an example, formulas for calculating a magnitude of a driving current $I_{Laser}$ of the laser are:

$$U_{ADIM} = \frac{R987}{R974 + R986 + R987} \times U_{T\_PWM}; \text{ and}$$

$$I_{Laser}[\text{mA}] = \frac{U_{ADIM}[\text{mV}]}{10 \times R_{ISEN}[\Omega]}.$$

Where $U_{T\_PWM}$ represents an average voltage amplitude of the effective current control signal T_PWM, $U_{ADIM}$ is the input voltage of the first pin ADIM, and $R_{ISEN}$ is a resistance value of a sampling resistor of the laser. For example, in a case where the laser is the first laser, $R_{ISEN}$ is a resistance value of the first sampling resistor, and its resistance value is an equivalent resistance value of the resistor R977, the resistor R978, the resistor R927, and the resistor R979 that are connected in parallel, i.e., $R_{ISEN}$=R977//R978//R979//R927. In a case where the laser is the second laser, $R_{ISEN}$ is a resistance value of the second sampling resistor, and its resistance value is an equivalent resistance value of the resistor R925, the resistor R976, the resistor R975, and the resistor R920 that are connected in parallel, i.e., $R_{ISEN}$=R925//R976//R975//R920. It will be noted that, in order to simplify the description, resistance values of the above resistors are represented by reference signs of corresponding resistors, which have different meanings instead.

In some examples, the first processing module may detect an actual driving current of the corresponding first laser through the first sampling resistor and feedback the actual driving current to the negative input terminal of the first comparator lm1 through the fifth pin ISEN1. By using a comparison result, the on and off of the switching transistor V827 is controlled by adjusting a duty cycle of the DRV square wave through the third pin DRV1, so as to adjust the voltage of the negative output port LD1− and then adjust voltages of both terminals, i.e., positive and negative electrodes, of the first laser, and to make a current value of the actual driving current of the first laser reach a required set current value (e.g., a current value of the driving current $I_{Laser}$). For example, in a case where a current value of a detection current is less than the set current value, the duty cycle of the DRV square wave may be increased through the first processing module in the driving chip 222; and in a case where the current value of the detection current is greater than the set current value, the duty cycle of the DRV square wave may be reduced through the first processing module in the driving chip 222.

Similarly, the second processing module may detect an actual driving current of the corresponding second laser through the second sampling resistor, and feedback the actual driving current to the negative input terminal of the first comparator lm1 through the fifth pin ISEN2. By using a comparison result, the on and off of the switching transistor V937 is controlled by adjusting the duty cycle of the DRV square wave through the third pin DRV2, so as to adjust the voltage of the negative output port LD1− and then adjust voltages of both terminals, i.e., positive and negative electrodes, of the second laser, and to make a current value of the actual driving current of the second laser reach the required set current value (e.g., the current value of the driving current $I_{Laser}$). For a manner in which the second processing module adjusts the current, reference may be made to the manner in which the first processing module adjusts the current, and details will not be repeated herein.

Switching frequencies of the switching transistors V827 and V927 may both be controlled by the DRV square wave output by the third pin DRV. As described above, the switching frequency of the DRV square wave is obtained by the switching frequency square wave generator H according to the resistance value of the resistor R904. Therefore, the switching frequencies of the two switching transistors V827 and V927 are determined by the resistance value of the resistor R904. A formula for calculating the switching frequencies $F_{OP}$ of the two switching transistors V827 and V927 is $$F_{OP}[\text{KHz}] = \frac{12.6 \times 10^3}{R904[\text{K}\Omega]}.$$

Signals output by the fourth pins PWM1 and PWM2 of the driving chip 222 may be understood as enable signals for controlling the driving chip 222 to work. When the signals output by the fourth pins PWM1 and PWM2 are at high levels, the driving chip 222 works normally. When the signals output by the fourth pins PWM1 and PWM2 are at low levels, the driving chip 222 stops working. For example, the signals output by the fourth pins PWM1 and PWM2 are continuously at high levels, which may ensure that the driving chip 222 continuously works.

In some embodiments, the laser source 23 is a multichiped laser (MCL), and the voltage output circuit is the step-up circuit. In this way, since the input voltage Vi of the step-up circuit is low, if there is a failure such as a short circuit of the step-up circuit, the low input voltage Vi will not exceed the rated voltage Vo of the laser, and then damage to the laser will not be caused.

Figure 16:
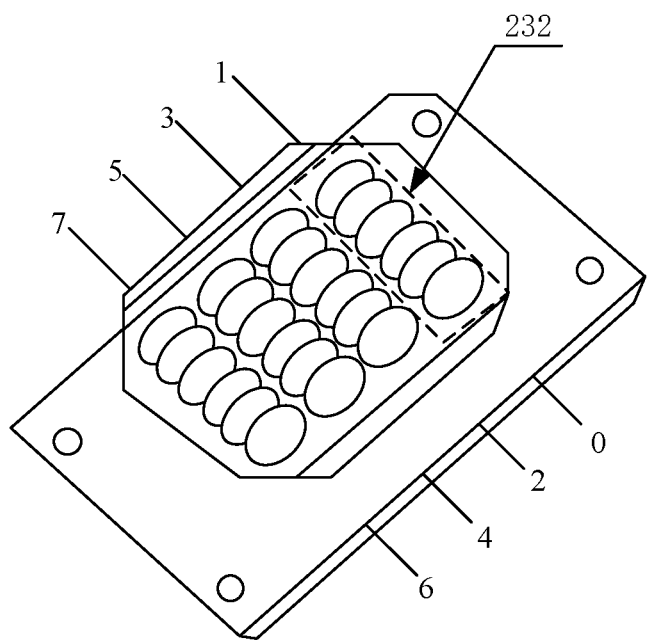
FIG. 16 is a schematic diagram of a multichiped laser (MCL), in accordance with some embodiments of the present disclosure.

FIG. 16 is a schematic diagram of an MCL, in accordance with some embodiments of the present disclosure. As shown in FIG. 16, the MCL includes four laser units 232, and each laser unit 232 includes a plurality of TOs connected in series. For example, the plurality of laser units may be connected in series in two ways, i.e., wired series connection and board series connection. The wired series connection means that the plurality of laser units are sequentially connected end to end through wires. The board series connection means that in a process of drawing a layout of the laser source driving circuit, the plurality of laser units are sequentially connected end to end through layout wiring. The number of the TOs connected in series may be set according to the brightness of the laser source.

In some examples, each laser unit 232 may include five TOs connected in series. For example, the MCL may adopt a 4×5 array layout, and the MCL includes twenty TOs in total. Or, each laser unit 232 may include six TOs connected in series. For example, the MCL may adopt a 4×6 array layout, and the MCL includes twenty-four TOs in total. Or, each laser unit 232 may include seven TOs connected in series. For example, the MCL may adopt a 4×7 array layout, and the MCL includes twenty-eight TOs in total.

It will be noted that in the embodiments of the present disclosure, the MCL may further include three laser units. Each laser unit includes five TOs connected in series. The MCL may adopt a 3×5 array layout, and the MCL includes fifteen TOs in total. Or, the MCL may further include two laser units. Each laser unit includes seven TOs connected in series. The MCL may adopt a 2×7 array layout, and the MCL includes fourteen TOs in total. FIG. 16 shows an example in which the MCL includes four laser units, and each laser unit includes six TOs connected in series, and the layout of the MCL is not limited.

It is worth noting that, in a case where the laser is the MCL, it needs to be connected to a laser series circuit to effectively drive the MCL.

Figure 17:
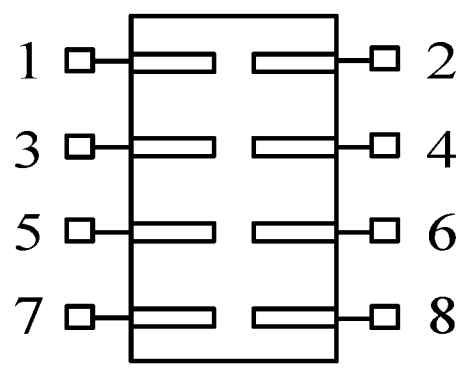
FIG. 17 is a schematic diagram of a laser series circuit, in accordance with some embodiments of the present disclosure.

In some examples, FIG. 17 is a schematic diagram of a laser series circuit, in accordance with some embodiments of the present disclosure. As shown in FIG. 17, the laser series circuit may be an XP socket. An output signal of the laser source driving circuit reaches a laser series board through the XP socket, so that the laser is lit. The XP socket may include a total of eight pins from pin 1 to pin 8. The pin 1 may be connected to a negative output port of the laser source driving circuit 22. The pin 7 may be connected to a positive output port of the laser source driving circuit 22. The pin 2 is used to be connected to a negative electrode of the laser, and the pin 8 is used to connect to a positive electrode of the laser.

Figure 18:
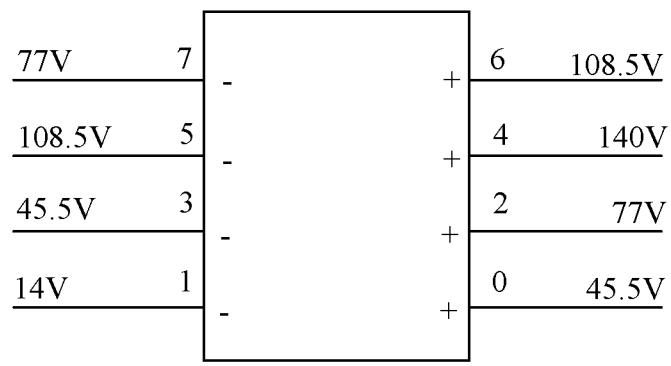
FIG. 18 is a schematic diagram of another MCL, in accordance with some embodiments of the present disclosure.

In some examples, FIG. 18 is a schematic diagram of another MCL, in accordance with some embodiments of the present disclosure. Referring to FIGS. 16 and 18, the MCL is a blue MCL, which includes four laser units 101. Each laser unit 101 includes two ports, and then the four laser units include eight ports from port 0 to port 7. The port 0, the port 2, the port 4, and the port 6 are positive electrodes, and the port 1, the port 3, the port 5, and the port 7 are negative electrodes. Referring to FIGS. 16 to 18, the port 5 may be connected to the port 6, the port 7 may be connected to the port 2, the port 3 may be connected to the port 0, the port 4 may be connected to pin 8 of the laser series circuit of the blue MCL, and the port 1 may be connected to pin 2 of the laser series circuit of the blue MCL. A voltage of 140 V transmitted by the laser source driving circuit 22 may be transmitted to a third laser unit through the laser series circuit, and stepped down to 108.5 V at the third laser unit, then transmitted to a fourth laser unit, and stepped down to 77 V at the fourth laser unit, then transmitted to a second laser unit, and stepped down to 45.5 V at the second laser unit, and finally transmitted to a first laser unit, and stepped down to 14 V at the first laser unit, so that the MCL emits light.

Figure 19:
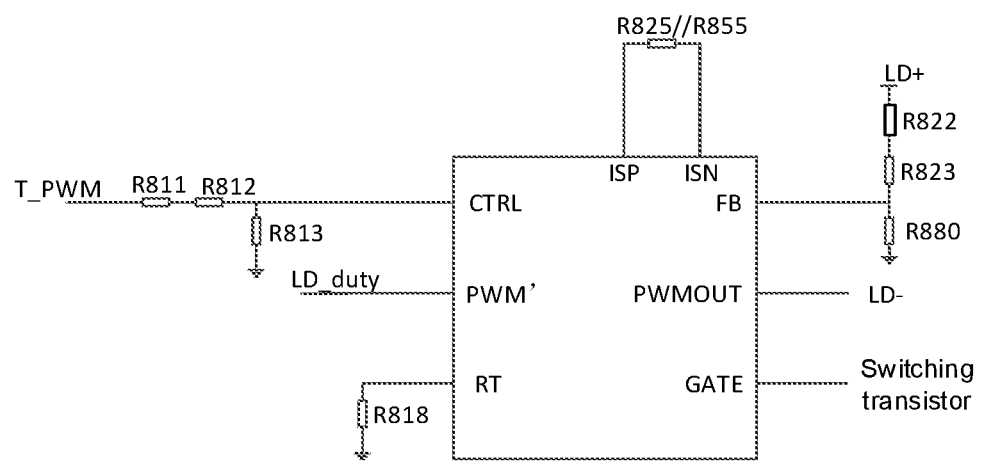
FIG. 19 is a schematic diagram of a control chip, in accordance with some embodiments of the present disclosure.

In this case, referring to FIG. 19, the driving chip 222 has a control pin CTRL configured to receive the effective current control signals T_PWM and a duty cycle adjustment pin PWM' configured to receive the duty cycle control signals LD_duty. The processing module further has a PWM signal output pin PWMOUT, a setting pin RT, a switching pin GATE, a first current control pin ISP, a second current control pin ISN, and an adjustment pin FB.

As shown in FIG. 19, the control pin CTRL is connected to a terminal of a resistor R812 and a terminal of a resistor R813. Another terminal of the resistor R812 is connected to a node or port that provides the effective current control signals T_PWM through a resistor R811. For example, it is connected to the another terminal of the resistor R1427 in FIG. 10. Another terminal of the resistor R813 is grounded. The effective current control signal T_PWM is input to the control pin CTRL through a voltage divider circuit composed of the resistor R811, the resistor R812, and the resistor R813. The setting pin RT is grounded through a resistor R818. A current detection resistor is connected in series between the first current control pin ISP and the second current control pin ISN. The current detection resistor may include a resistor R825 and a resistor R855 that are connected in parallel. The adjustment pin FB is respectively connected to a terminal of a resistor R823 and a terminal of a resistor R880. Another terminal of the resistor R823 is connected to a positive output port LD+ (i.e., the positive electrode of the laser) through the resistor R811 and a resistor R822 that are connected in series. Another terminal of the resistor R880 is grounded. The PWM signal output pin PWMOUT is connected to a negative output port LD− (i.e., the negative electrode of the laser). The switching pin GATE is connected to a switching transistor. For example, the switching transistor may be an N-channel metal oxide semiconductor (NMOS) transistor. The positive output port LD+ and the negative output port LD− may be connected to the laser series circuit.

Figure 20:
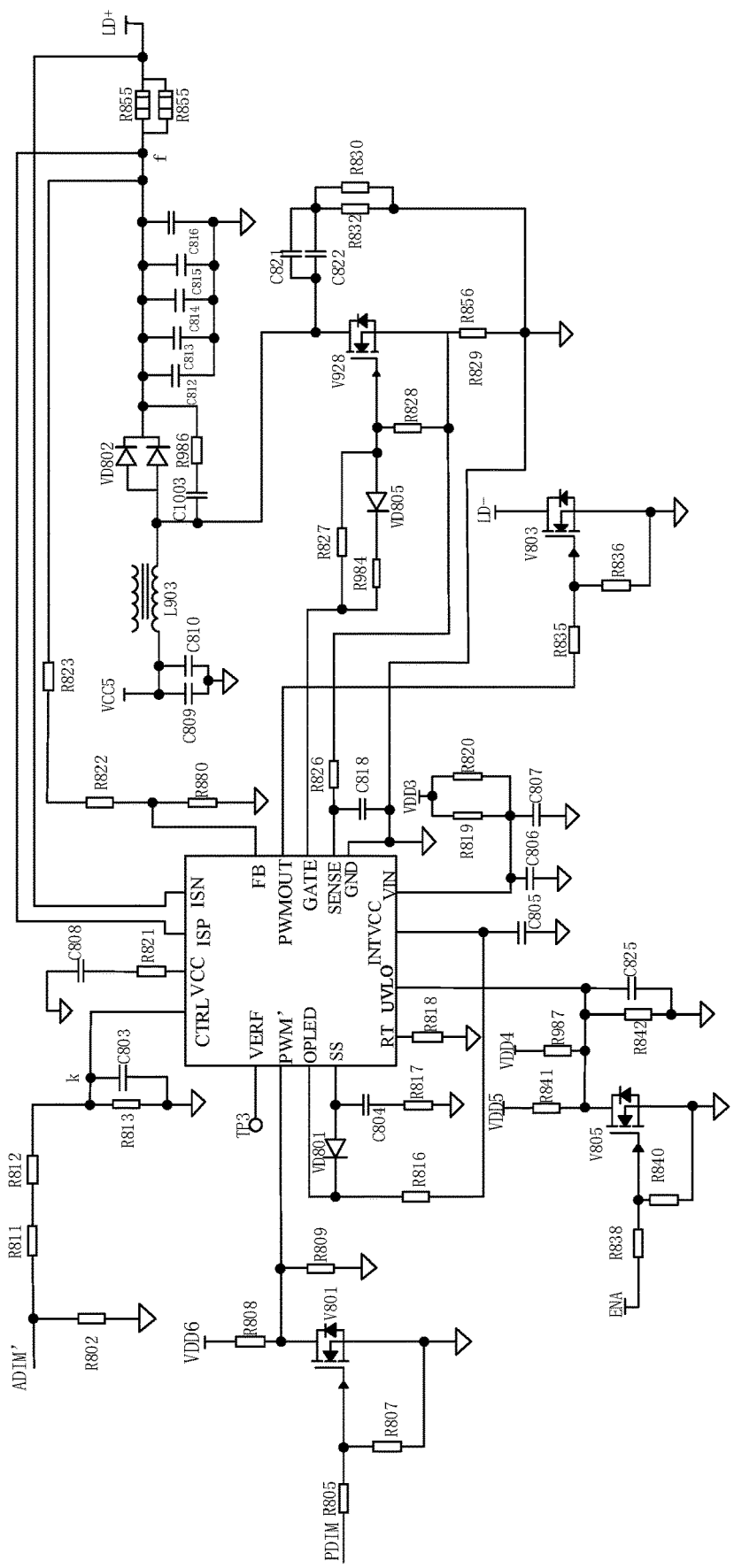
FIG. 20 is a circuit diagram of another laser source driving circuit, in accordance with some embodiments of the present disclosure.

In some embodiments, FIG. 20 is a circuit diagram of a laser source driving circuit. As shown in FIG. 20, the driving chip further includes a power supply pin VC, a function pin SENSE, a ground pin GND, a pin VIN, a pin INTVCC, a pin OPENLED, a pin VERF, and a pin SS.

The control pin CTRL is connected to a node k. The resistor R813 and a capacitor C803 are connected in parallel. The terminal of the resistor R813 and the capacitor C803 that are connected in parallel is connected to a node k. The another terminal of the resistor R813 and the capacitor C803 that are connected in parallel is grounded. A terminal of the resistor R811 and the resistor R822 that are connected in series is connected to the node k. Another terminal of the resistor R811 and the resistor R822 that are connected in series is connected to an ADIM' port and a terminal of the resistor R802. Another terminal of the resistor R802 is grounded. The ADIM' port is configured to transmit a current control signal (e.g., the effective current control signal). The capacitor C803 may be selected according to actual conditions. By providing the capacitor C803, a current overcharge of the laser may be suppressed, and a function of the filter circuit may be achieved.

A resistor R821 and a capacitor C808 are connected in series between the power supply pin VC and the ground. The power supply pin VC is also referred to as a transconductance error amplifier output pin, which forms a stable voltage loop with the externally connected resistor R821 and capacitor C808 to achieve voltage stabilization of the circuit.

The first current control pin ISP is connected to a node f. The second current control pin ISN is connected to the positive electrode LD+ of the laser. The resistor R825 and the resistor R855 are connected in parallel. The resistor R825 and the resistor R855 that are connected in parallel are connected in series between the positive electrode LD+ of the laser and the node f.

The function pin SENSE is configured to detect a magnitude of a driving current in the peripheral circuit. The function pin SENSE is connected to a terminal of a resistor R826. Another terminal of the resistor R826 is grounded through a capacitor C818. The terminal of the resistor R826 is further connected to a terminal of a resistor R828 and a terminal of a resistor R856. Another terminal of the resistor R856 is grounded. Another terminal of the resistor R828 is connected to a terminal of a resistor R827, a positive electrode of a diode VD805, and a gate of a switching transistor V928. A negative electrode of the diode VD805 is connected to a terminal of a resistor R984. Another terminal of the resistor R984 and another terminal of the resistor R827 are connected to the switching pin GATE. A drain of the switching transistor V928 is connected to the terminal of the resistor R856. A capacitor C821 and a capacitor C822 are connected in parallel. A resistor R832 and a resistor R830 are connected in parallel. The capacitor C821 and the capacitor C822 that are connected in parallel and the resistor R832 and the resistor R830 that are connected in parallel are connected in series between a source of the switching transistor V928 and the ground. The source of the switching transistor V928 is further connected to a terminal of a capacitor C1003, a positive electrode of two diodes VD802 connected in parallel, and a terminal of an inductor L903. Another terminal of the inductor L903 is connected to a power supply terminal VCC5 and a terminal of capacitors C809 and C810 that are connected in parallel. Another terminal of the capacitors C809 and C810 that are connected in parallel is grounded. Another terminal of the capacitor C1003 is connected to the terminal of the resistor R986. Another terminal of the resistor R986 is connected to a negative electrode of the two diodes VD802 connected in parallel and the node f. Capacitors C812, C813, C814, C815, and C816 are further connected in parallel between the node f and the ground.

The adjustment pin FB is connected to a terminal of the resistor R822 and the terminal of the resistor R880. The another terminal of the resistor R880 is grounded. Another terminal of the resistor R822 is connected to the node f through the resistor R823.

It will be noted that, each of nodes (e.g., the node k and the node f) in the circuit provided in the embodiments of the present disclosure do not represent actually existing component but represent a junction point of a related electrical connection in a circuit diagram. That is, the node is a node equivalent to the junction point of the related electrical connections in the circuit diagram.

The PWM signal output pin PWMOUT is connected to a terminal of a resistor R835. Another terminal of the resistor R835 is connected to a gate of a switching transistor V803 and a terminal of a resistor R836. Another terminal of the resistor R836 and a drain of the switching transistor V803 are both grounded. A source of the switching transistor V803 is connected to the negative electrode LD− of the laser.

The ground pin GND is grounded.

The pin VIN is a power supply pin of the driving chip. The pin VIN is connected to a terminal of a capacitor C806, a terminal of a capacitor C807, a terminal of a resistor R819, and a terminal of a resistor R820. Another terminal of the capacitor C806 and another terminal of the capacitor C807 are both grounded. Another terminal of the resistor R819 and another terminal of the resistor R820 are connected to a power supply terminal VDD3.

The pin INTVCC is configured to provide a stabilized voltage power supply. The pin INTVCC is connected to a terminal of a capacitor C805 and a terminal of a resistor R816. Another terminal of the capacitor C805 is grounded. Another terminal of the resistor R816 is connected to the pin OPENLED and a negative electrode of a diode VD801. A positive electrode of the diode VD801 is connected to the pin SS. The pin INTVCC may supply power to internal loads of the driving chip 222, for example, a driver of the pin GATE and a driver of the pin PWMOUT. For example, a power supply voltage of the pin INTVCC may be 7.15 V.

The pin OPENLED is configured to detect whether a load of the peripheral circuit is open-circuited. When the load of the peripheral circuit is open-circuited, the driving chip outputs a low level signal for indicating an open circuit. The pin SS is a soft-start pin, which is configured to control a time of soft-start. The time of soft-start is set by a capacitor C804 externally connected to the pin SS.

A pin UVLO is connected to a terminal of a capacitor C825, a terminal of the resistor R842, a terminal of a resistor R987, a terminal of a resistor R841, and a source of a switching transistor V805. Another terminal of the capacitor C825 and another terminal of the resistor R842 are grounded. Another terminal of the resistor R987 is connected to a power supply terminal VDD4. Another terminal of the resistor R841 is connected to a power supply terminal VDD5. A gate of the switching transistor V805 is connected to a terminal of a resistor R838 and a terminal of a resistor R840. Another terminal of the resistor R838 is used to receive the lighting enable signal ENA. Another terminal of the resistor R840 and a drain of the switching transistor V805 are both grounded.

The setting pin RT is grounded through the resistor R818.

The duty cycle adjustment pin PWM' is connected to a terminal of a resistor R809, a terminal of a resistor R808 and a source of a switching transistor V801. Another terminal of the resistor R808 is connected to a power supply terminal VDD6. A gate of the switching transistor V805 is connected to a terminal of a resistor R801 and a terminal of a resistor R807. A terminal of a resistor R805 is connected to a PDIM port. Another terminal of the resistor R807 and a drain of the switching transistor V801 are both grounded. The PDIM port is configured to transmit the duty cycle control signal LD_duty.

The pin VREF is a reference voltage output pin, and a reference voltage output thereby may be 2 V. The pin VERF may be connected to a test point TP3 for testing the reference voltage or may be an idle pin.

Referring to FIG. 20, a working current of the MCL is 3 A, and a voltage consumed across the MCL is 82 V. In this case, it may be possible to step up the voltage from 60 V. The resistor R811, the resistor R812, and the resistor R813 are voltage division resistors and are able to divide the voltage of the effective current control signal T_PWM provided by the data selector 213. The voltage of the effective current control signal T_PWM is divided by the resistor R811, the resistor R812, and the resistor R813 and then input to the control pin CTRL of the driving chip 222. The driving chip 222 adjusts a driving current $I_{LD}$ of the MCL according to an input voltage of the control pin CTRL. Formulas for calculating the driving current $I_{LD}$ are:

$$I_{LD} = \frac{V_{CTRL} - 100 \text{ mV}}{R_{LD} \cdot 10}; \text{ and } V_{CTRL} = \frac{R813}{R811 + R812 + R813} \cdot V_{ADIM}.$$

Where $V_{ADIM}$ represents the average voltage amplitude of the effective current control signal T_PWM; $V_{CTRL}$ is the input voltage of the pin CTRL; $R_{LD}$ is the resistance value of the sampling resistor. For example, as shown in FIG. 20, it is a resistance value of the resistor R825 and the resistor R855 that are connected in parallel, i.e., $R_{LD}=R825//R855$.

The duty cycle adjustment pin PWM' is connected to a terminal for transmitting LD_Duty signal (i.e., the PDIM terminal). When a signal of the duty cycle adjustment pin PWM' is at a high level, the signal output by pin PWMOUT is at a high level, so that the switching transistor V803 is turned on, and the negative terminal of the MCL is grounded to form a loop to light up the laser.

The pin RT is configured to set a switching frequency of the switching transistor V928 (e.g., the pin RT sets the switching frequency of the switching transistor V928 by being directly or indirectly connected to the pin GATE inside the driving chip) and is grounded through the resistor R818. The pin FB is configured to set a maximum output voltage of the step-up circuit, so that the voltage across the MCL does not exceed this limit value, thereby protecting the MCL.

For example, a voltage of the power supply terminal VCC5 may be 48 V, a voltage of the power supply terminal VDD5 may be 48 V, and a voltage of the power supply terminal VDD6 may be 5 V.

Figure 21:
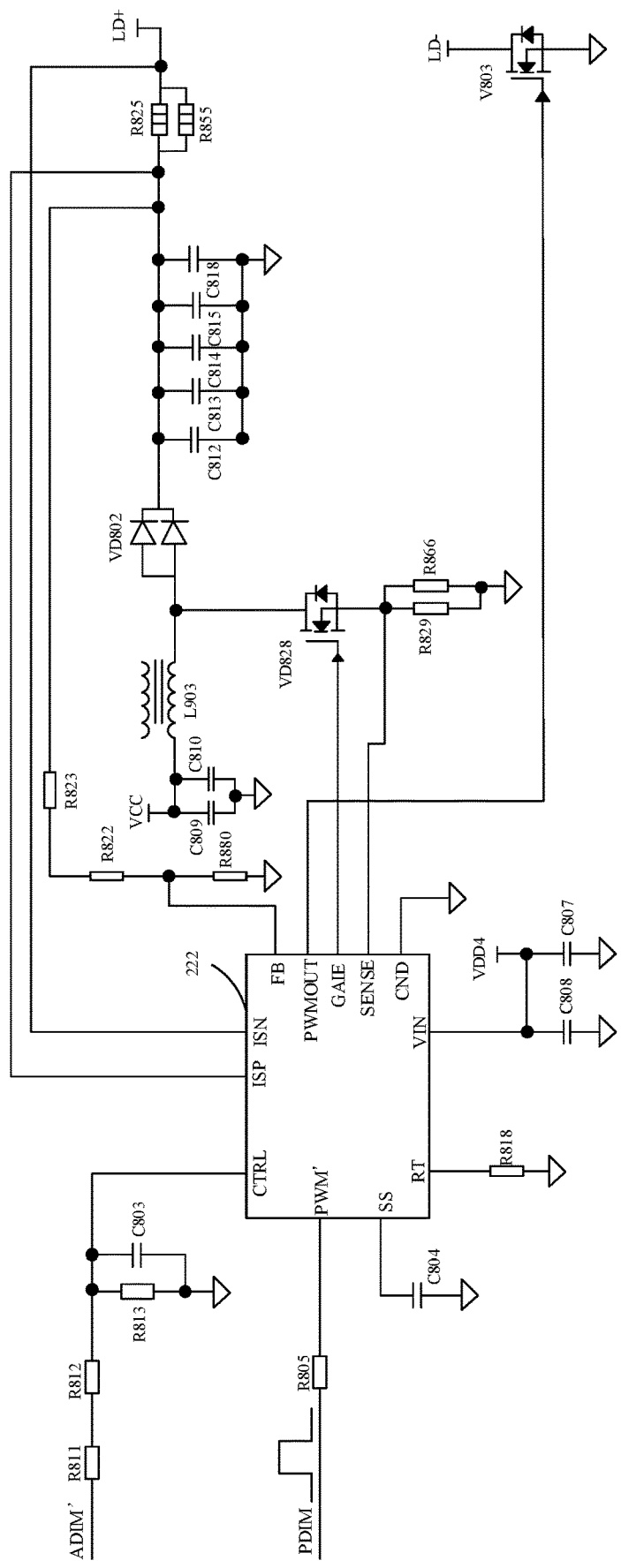
FIG. 21 is a circuit diagram of a step-up circuit, in accordance with some embodiments of the present disclosure.

It will be noted that FIG. 21 is a circuit diagram of a step-up circuit, in accordance with some embodiments of the present disclosure. For functions of respective pins and components in FIG. 21, reference may be made to the detailed description of the functions of the respective pins and components in FIG. 20, and details will not be described herein.

Figure 22:
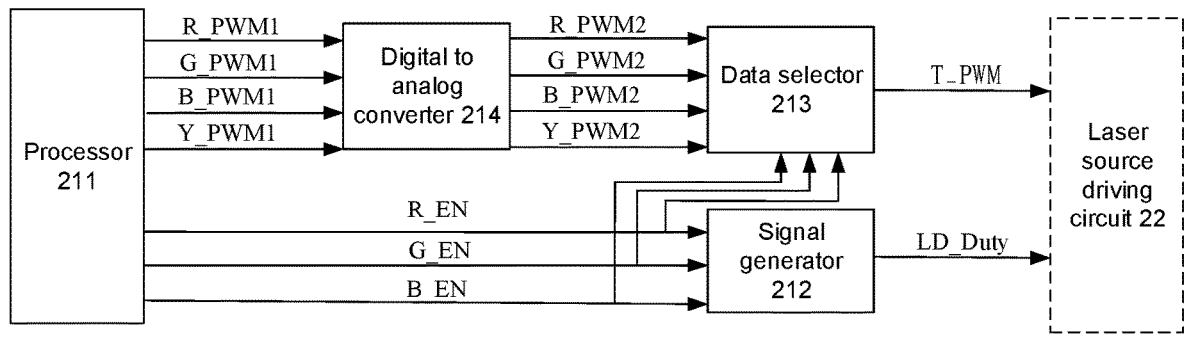
FIG. 22 is a schematic diagram of yet another display control circuit, in accordance with some embodiments of the present disclosure.

In some embodiments, as shown in FIG. 22, the display control circuit 21 further includes a digital to analog converter (DAC) 214 between the processor 211 and the data selector 213. The digital to analog converter 214 may be a digital to analog converter (DAC) chip. In a case where the current control signal is a PWM signal, since the processor 211 outputs a high-frequency PWM signal, and the back-end driving circuit (e.g., the laser source driving circuit 22) needs a stable DC voltage signal, a signal requirement of the back-end driving circuit is achieved through the digital to analog converter 214.

The digital to analog converter 214 is configured to receive the N current control signals in form of digital signals, to convert the received N current control signals into N current control signals in form of analog signals and transmit the converted N current control signals to the data selector 213. The converted N current control signals are DC voltage signals. For example, as shown in FIG. 22, the N current control signals in the form of digital signals include a total of four digital signals, i.e., R_PWM1, G_PWM1, B_PWM1, and Y_PWM1, and the corresponding N current control signals include a total of four analog signals, i.e., R_PWM2, G_PWM2, B_PWM2, and Y_PWM2.

It is worth noting that, in the laser source driving circuit provided in the embodiments of the present disclosure, the switching transistors may all be MOS transistors, such as NMOS transistors or PMOS transistors. On and off times of the peripheral circuit reach an ns level, and on and off times of the laser source driving circuit reach a μs level, so that the laser source has a fast current response speed, a high precision, a large current, and a low ripple, and the brightness of the laser source may be rapidly adjusted. In addition, the laser source driving circuit adopts fast response devices (e.g., the MOS transistors) and the driving chip. In this way, it may be possible to ensure that turned-on and turned-off response delay times of the current are within 1 us, rising and falling times of the current are within 20 us, a ripple frequency of the current is within 400 kHz, and a variation amplitude of the current is within ±5%. As a result, it may be possible to achieve that the turned-on response delay of the current is small, the rising time of the current is short, the turned-off response delay of the current is small, the falling time of the current is short, the ripple frequency is large, and the variation amplitude is small. Therefore, a rapid control of the current of the laser source ensures that the current of the laser source with an ultra-high contrast function may quickly follow requirements of the image display for the laser source control and ensures a real-time modulation of the current and a strict synchronization of the image display, and in turn, a subsequent high-contrast image display algorithm is achieved.

With the development of society, people have higher and higher requirements for the display effect of the laser projection apparatus, and therefore have higher requirements for a series of parameters (e.g., a contrast) that affect the display effect. The contrast of laser projection apparatus may be classified into a static contrast and a dynamic contrast. The static contrast usually refers to a contrast calculated by using a contrast algorithm developed by the American national standards institute (ANSI), which refers to a ratio of a brightness of a white region to a brightness of a black region in a picture (i.e., a same frame of image).

The dynamic contrast refers to a light-to-dark ratio of the same frame of image during display, which is related to the brightness of the laser source during the display, and is a ratio of a brightness of a brightest white region to a brightness of a darkest black region of this frame of image during the display. For example, the dynamic contrast C satisfies a formula $$C = \frac{L_W}{L_B},$$

where $L_W$ is the brightness of the brightest white region of this frame of image during the display, and $L_B$ is the brightness of the darkest black region of this frame of image during the display.

It can be seen from the above dynamic contrast formula that, when $L_W$ reaches a maximum value, the dynamic contrast C may be improved by reducing a value of $L_B$. An actual brightness of the image displayed by the laser projection apparatus is usually determined by two factors. One factor is the brightness of the laser source, and the other factor is a gray scale value of the image (i.e., a brightness of the image itself). A superposition of the two factors may finally determine an actual display brightness of a frame of image. Therefore, the display effect may be optimized by adjusting a ratio between the two factors.

In some examples, the brightness of the image itself in a video displayed by the laser projection apparatus is constantly changing based on its contents. For each frame of image, the laser source may be adjusted according to the brightness of the image itself, thereby adjusting the actual display brightness of the image. For example, in a case where a frame of image is a black image, an actual display brightness of the frame of image may be made lower than its own brightness by reducing the brightness of the laser source. In this way, by reducing the brightness of the laser source, a lower limit value, i.e., a lowest actual display brightness ($L_B$), of the actual display brightness of the image displayed by the laser projection apparatus may be reduced, and the dynamic contrast of the laser projection apparatus when it displays the image may be improved. In addition, since the brightness of the laser source is reduced, a power consumption of the laser projection apparatus is also reduced.

For the laser projection apparatus provided in the embodiments of the present disclosure, the dynamic contrast of the laser projection apparatus may be improved without changing the actual display brightness of the image. The image display algorithm is as follows: the brightness of the laser source and the gray scale value of each frame of image are processed separately to enhance a detail expression of the image, so that the brightness of the laser source is reduced and the dynamic contrast of the laser projection apparatus is improved on a premise of ensuring that the brightness of the displayed image remains unchanged.

Figure 23:
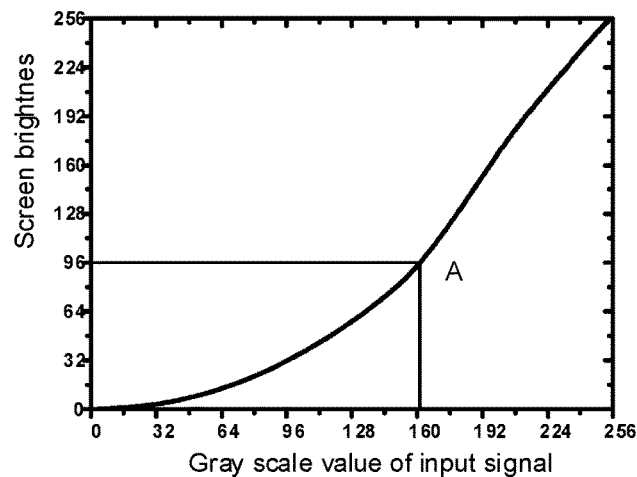
FIG. 23 is a graph showing a relationship between a gray scale value of an input signal and a screen brightness, in accordance with some embodiments of the present disclosure.
Figure 24:
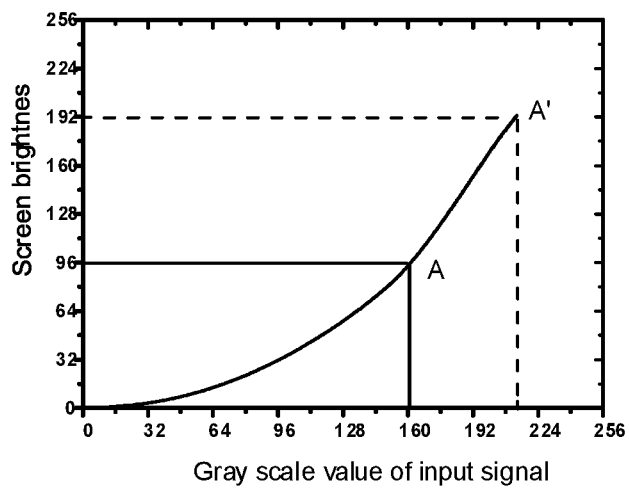
FIG. 24 is a graph showing another relationship between a gray scale value of an input signal and a screen brightness, in accordance with some embodiments of the present disclosure.
Figure 25:
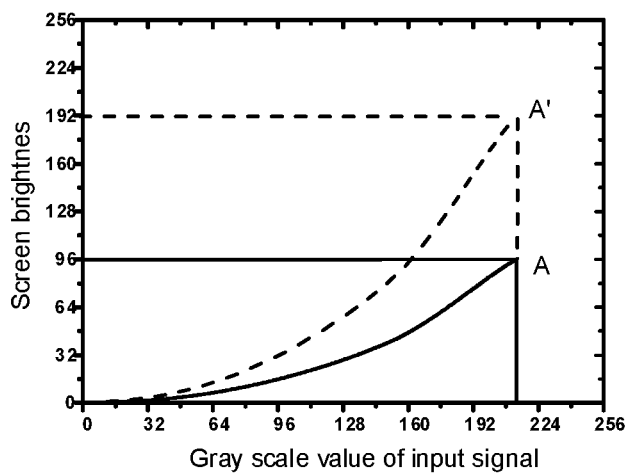
FIG. 25 is a graph showing yet another relationship between a gray scale value of an input signal and a screen brightness, in accordance with some embodiments of the present disclosure.

In some embodiments, FIGS. 23 to 25 show relationships between a gray scale value of an input signal (also referred to as a display gray scale value or the brightness of the image itself) and a screen brightness (i.e., the actual display brightness). As shown in FIGS. 23 to 25, an abscissa is the gray scale value of the input signal, and an ordinate is the screen brightness. For example, the gray scale value of the image that the laser projection apparatus is able to process is in a range of 1 to 256, inclusive. That is, a maximum gray scale value is 256. A power of the laser source (since the power of the laser source is proportional to the brightness of the laser source, for example, the power of the laser source is equivalent to the brightness of the laser source) is a standard quantity (i.e., a reference quantity). For example, in units of one, a curve (i.e., a gamma curve) of the gray scale value of the input signal of the laser projection apparatus versus the screen brightness is the solid line in FIG. 23. For example, if a gray scale value of an input signal of a currently displayed frame of image A is 160, a corresponding screen brightness is 96. As shown in FIG. 24, the gray scale value of the input signal of the frame of image A is gained by D times, and then the frame of image A is converted into an image A' and a screen brightness corresponding to the image A' is 192. As shown in FIG. 25, the screen brightness may be reduced to 96 by reducing the power of the laser source, thereby converting the image A' into the image A. In this way, the laser projection apparatus provided in the embodiments of the present disclosure may expand the range of the displayed gray scale value of the image, i.e., increase the upper limit value of the displayed gray scale value, enhance the detail expression of the image, and on the premise of ensuring that the actual display brightness of the image remains unchanged, reduce the brightness of the laser source, improve the contrast during the display, and reduce the power consumption.

Figure 26:
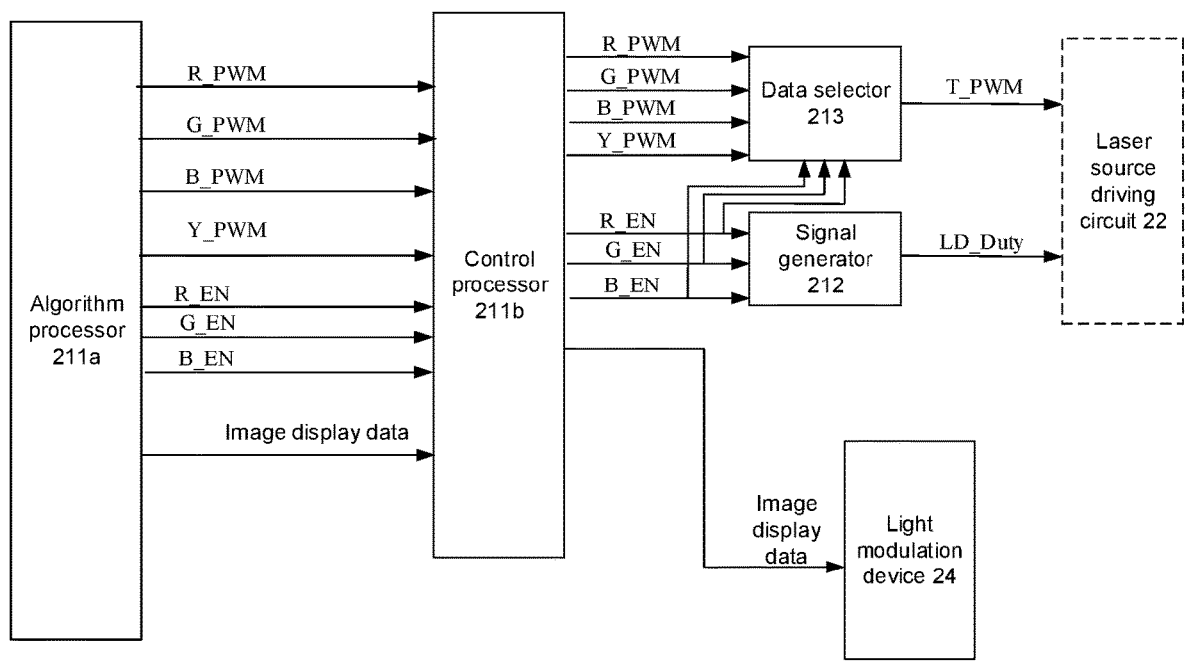
FIG. 26 is a schematic diagram of another laser projection apparatus, in accordance with some embodiments of the present disclosure.

In some embodiments, as shown in FIG. 26, the laser projection apparatus further includes a light modulation device 24. The light modulation device 24 may be a digital micro mirror device (DMD) or a liquid crystal on silicon (LCOS).

In some embodiments, the processor 211 includes an algorithm processor 211a and a control processor 211b. The algorithm processor 211a is connected to the control processor 211b. The control processor 211b is further connected to the data selector 213 and the light modulation device 24.

The algorithm processor 211a is configured to determine a gain value α of each frame of image according to the gray scale value of each frame of image, α being greater than or equal to 1 ($α≥1$). The algorithm processor may be a field-programmable gate array (FPGA).

Image display data of each frame of image may reflect a basic distribution of colors of each frame of image and a basic tone thereof. In a case where the image display data is 4K data, the 4K data may be input to the algorithm processor 211a in an eight-channel V-by-One (abbreviated as VBO, which is a digital interface standard developed for image transmission) signal transmission manner.

The algorithm processor 211a is further configured to send the N current control signals, the M enable signals, and the image display data to the control processor 211b.

In some embodiments, the algorithm processor 211a may generate the N current control signals corresponding to each of the plurality of frames of display images in a variety of ways. In some examples, after determining the gain value α of each frame of image, the algorithm processor 211a calculates a brightness of each primary color and generates a current control signal corresponding to the primary color and a hybrid-color current control signal based on the brightness through a second preset algorithm. In some other examples, the algorithm processor 211a may pre-store a corresponding relationship between the current control signal and the brightness, and after determining the gain value α of each frame of image, the algorithm processor 211a calculates the brightness of each primary color, and then queries the corresponding relationship according to the calculated brightness to obtain a current control signal corresponding to the brightness. For example, in the case where the current control signal is the PWM signal, a corresponding relationship between the current control signal and the current may be characterized by a corresponding relationship between a PWM value and the brightness.

The control processor 211b is configured to transmit the N current control signals and the M enable signals to the data selector 213. The control processor 211b is further configured to transmit the M enable signals to the signal generator 212.

The control processor 211b is further configured to send the image display data to the light modulation device 24. The laser projection apparatus is further configured to control a corresponding adjusted brightness of the laser source according to each current control signal. The adjusted brightness is $1/α$ of a brightness before the adjustment. The laser projection apparatus is further configured to adjust the gray scale value of each frame of image according to the image display data. The adjusted gray scale value is a times a gray scale value before the adjustment.

The light modulation device 24 is configured to modulate the beams of the laser source according to the image display data to generate the image beams and project the image beams onto the projection screen to achieve display of each frame of image.

In some embodiments, the laser projection apparatus may further include a plurality of optical lenses located between the light modulation device 24 and the projection screen. The plurality of optical lenses are used to transmit, reflect, or refract the image beams to project the image beams onto the projection screen.

In the embodiments of the present disclosure, the display control circuit 21 may adjust the brightness of the laser source in real time based on the gain value α of each frame of image, i.e., a change of each frame of image, so that a high dynamic contrast may be achieved. In addition, in a laser source switching circuit of the laser series circuit, in a case where a first switching transistor is an MOS transistor, such as an NMOS transistor, on and off times of the laser source switching circuit reach the ns level, and on and off times of the laser series circuit reach the μs level, so that the laser source has a fast current response speed and a high precision. That is, the laser series circuit may quickly and precisely respond to a change in a brightness of each pixel of the image. In addition, the brightness of the laser source may be adjusted arbitrarily from 0 to a brightness corresponding to a rated current value. This driving circuit is a basis for achieving the high dynamic contrast, and a dynamic brightness adjustment of the laser projection apparatus is supported on hardware.

Figure 27:
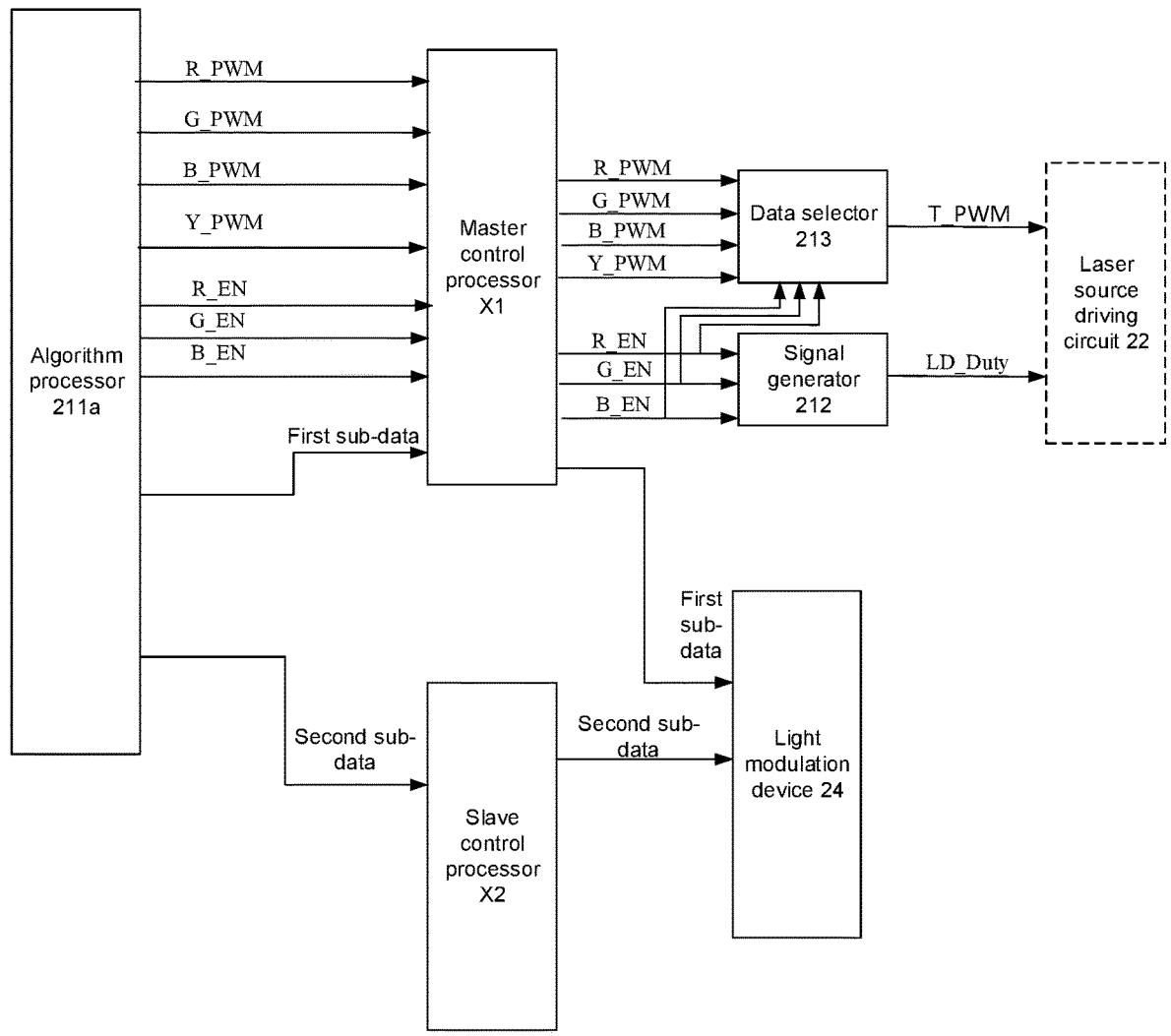
FIG. 27 is a schematic diagram of yet another laser projection apparatus, in accordance with some embodiments of the present disclosure.

In some embodiments, as shown in FIG. 27, the control processor 211*b* includes a master control processor X1 and a slave control processor X2. The algorithm processor 211*a* is connected to the master control processor X1 and the slave control processor X2. The master control processor X1 is further connected to the laser source driving circuit 22 and the light modulation device 24. The slave control processor X2 is further connected to the light modulation device 24. In this case, the laser projection apparatus in the embodiments of the present disclosure adopts a manner that master and slave processors cooperatively process the image display data. In this manner, it is possible to avoid that the amount of the image display data of laser projection apparatus is getting larger and larger as a resolution of the laser projection apparatus increases, which may easily cause a problem of low processing efficiency of the processor. For example, the image display data is 4K data, i.e., data with a pixel resolution of 4096×2160. Therefore, the processing efficiency is improved.

In some embodiments, the laser projection apparatus may include a display panel, a power supply panel, and a laser panel. The algorithm processor 211*a*, the master control processor X1, the slave control processor X2, the data selector 213, the signal generator 212, and the digital to analog converter 214 are all arranged on the display panel. The laser source driving circuit 22 is provided on the power supply panel. The laser source 23 is provided on the laser panel.

The algorithm processor 211*a* is configured to determine the gain value α of each frame of image according to the gray scale value of each frame of image, a being greater than or equal to 1 (α≥1).

The algorithm processor 211*a* is further configured to send the N current control signals, the M enable signals, and first sub-data to the master control processor X1 and send second sub-data to the slave control processor. The first sub-data and the second sub-data constitute the image display data. For example, as shown in FIG. 27, the N current control signals include the red PWM signal R_PWM, the green PWM signal G_PWM, the blue PWM signal B_PWM, and the hybrid-color PWM signal Y_PWM.

In some examples, the image display data is 4K data, the first sub-data and the second sub-data are both 60-bit data, and the first sub-data and the second sub-data may both be low-voltage differential signals (LVDSs). The first sub-data is a two-channel west LVDS, and the second sub-data may be a two-channel east LVDS.

The master control processor X1 is configured to receive the N current control signals and the M enable signals and transmit the received N current control signals and M enable signals to the data selector. For example, the master control processor X1 may cache a received signal. The master control processor X1 is further configured to transmit the M enable signals to the signal generator and send the first sub-data to the optical modulation device. For example, as shown in FIG. 27, the M enable signals are the red enable signal R_EN, the green enable signal G_EN, and the blue enable signal B_EN. For example, the signal output circuit of the processor 211 shown in FIG. 5 may be integrated in the master control processor X1.

The slave control processor X2 is configured to send the second sub-data to the light modulation device 24.

The light modulation device 24 is configured to modulate the beams of the laser source according to the first sub-data and the second sub-data to generate the image beams and project the image beams onto the projection screen, so that the laser projection apparatus may display each frame of image.

Figure 28:
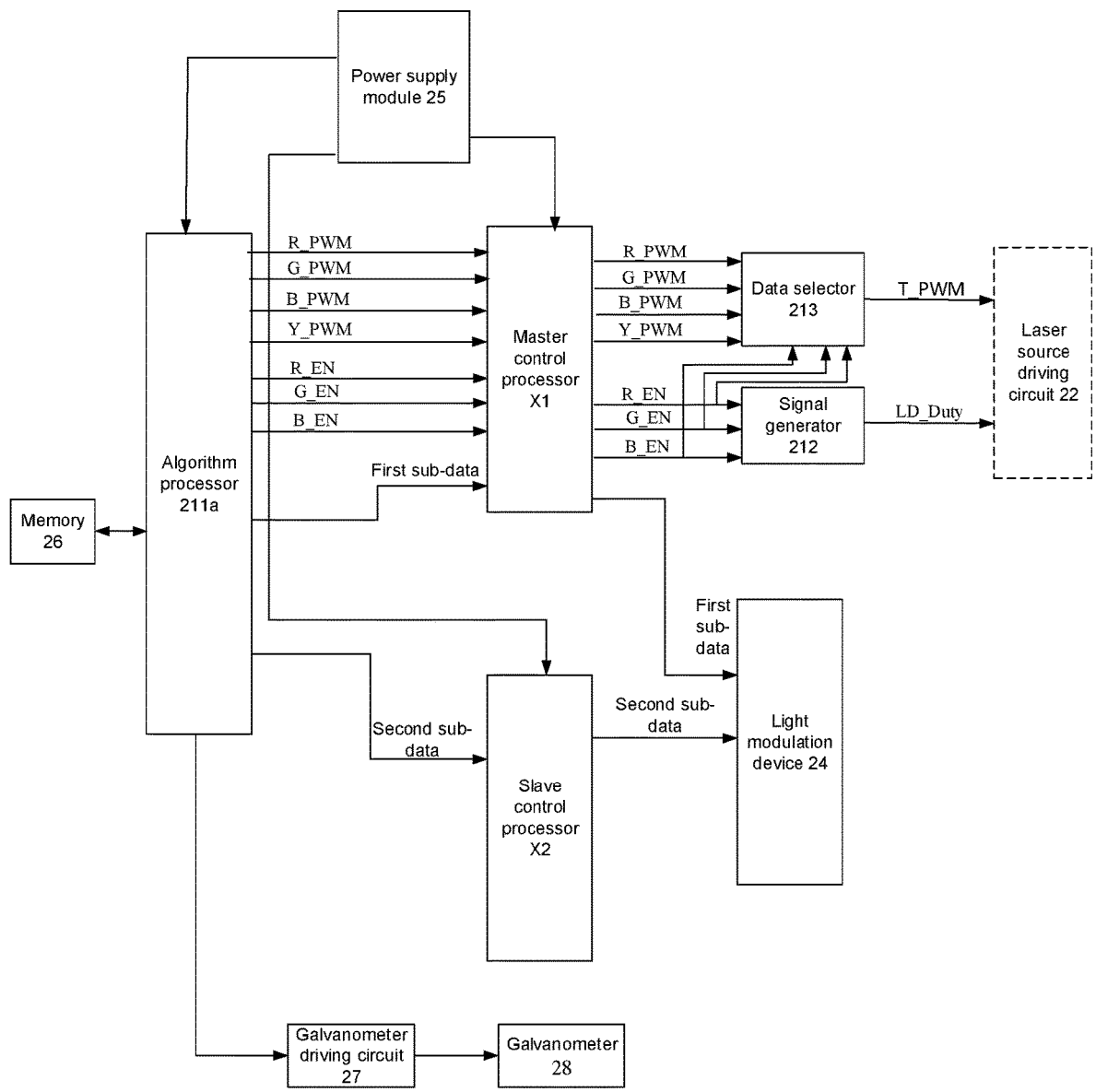
FIG. 28 is a schematic diagram of yet another laser projection apparatus, in accordance with some embodiments of the present disclosure.

In some embodiments, as shown in FIG. 28, the laser projection apparatus further includes a memory 26, a galvanometer driving circuit 27, a galvanometer 28 and a power supply module 25. The memory is connected to the algorithm processor 211*a* and is configured to store the image display data. Referring to FIGS. 24 and 25, the memory 26 stores the adjusted gray scale value of each frame of image. For example, the memory is a double data rate (DDR) memory. The galvanometer driving circuit 27 is connected to the algorithm processor 211*a* and the galvanometer 28 and is configured to drive the galvanometer 28 to vibrate under control of the algorithm processor 211*a*. For example, the galvanometer 28 may be a four-dimensional galvanometer. That is, the galvanometer 28 is able to vibrate in four directions. By providing the galvanometer driving circuit 27 and the galvanometer 28, it is possible to display a superimposed image, so as to improve detail expression and the resolution. The power supply module is configured to provide electrical energy to electrical components and is connected to the electrical components in the laser projection apparatus. FIG. 12 only shows an example in which the power supply module 25 is connected to the algorithm processor 211*a*, the master control processor X1 and the slave control processor X2.

It is worth noting that the laser source 23 in the laser projection apparatus may be the blue laser source 130 in FIG. 1.

In some embodiments, the laser projection apparatus may further include the optical machine 20, the projection lens 30, and components except the blue laser source 130 in the projection laser source 10. For functions of the components, reference may be made to FIG. 1, and details will not be repeated herein.

A person skilled in the art will easily think of other embodiments of the present disclosure after considering the description and implementing the present disclosure disclosed herein. The present disclosure is intended to cover any variations, uses, or adaptive changes of the present disclosure. These variations, uses, or adaptive changes follow general principles of the present disclosure and include common knowledge or conventional technical means in the technical field that are not disclosed in the present disclosure. The description and the embodiments are only regarded as exemplary, and the true scope and spirit of the present disclosure are indicated by the claims.

It can be understood that the present disclosure is not limited to the structures that have been described above and shown in the drawings, and various modifications and changes may be made without departing from the scope of the present disclosure, which is limited only by the appended claims.

What is claimed is:
1. A laser projection apparatus, comprising:
a display control circuit configured to generate N current control signals and M enable signals that correspond to each of a plurality of frames of images and select an effective current control signal from the N current control signals, wherein the M enable signals are in one-to-one correspondence with M primary colors of each frame of image, N is an integer greater than 2, and M is a positive integer;
a laser source configured to emit laser light of at least one color; and a laser source driving circuit connected to the display control circuit and the laser source, the laser source driving circuit being configured to control the laser source to emit light according to the effective current control signal; and
a light modulation device; wherein
the display control circuit includes an algorithm processor and a control processor; the algorithm processor is connected to the control processor, and the control processor is further connected to the light modulation device;
the algorithm processor is configured to: determine a gain value α of each frame of image according to a gray scale value of each frame of image, wherein α is greater than or equal to 1 (α≥1); and transmit the N current control signals, the M enable signals, and image display data to the control processor, wherein each N current control signal is configured to indicate a corresponding adjusted brightness of the laser source, and the adjusted brightness is 1/α of a brightness before the adjustment;
the control processor is configured to: transmit the N current control signals and the M enable signals to the laser source driving circuit; and transmit the image display data to the light modulation device, wherein the image display data is configured to indicate an adjusted gray scale value of each frame of image, and the adjusted gray scale value of each frame of image is α times a gray scale value of each frame of image before the adjustment; and
the light modulation device is configured to modulate beams emitted by the laser source according to the image display data to generate image beams.

2. The laser projection apparatus according to claim 1, wherein the algorithm processor is further configured to calculate a brightness of each primary color after determining the gain value α of each frame of image and generate the N current control signals through a second preset algorithm or a pre-store corresponding relationship between a current control signal and a brightness.

3. The laser projection apparatus according to claim 1, wherein the image display data of each frame of image is input to the algorithm processor in an eight-channel V-by-One, and the algorithm processor is a field-programmable gate array (FPGA).

4. The laser projection apparatus according to claim 1, wherein the laser source driving circuit includes a voltage output circuit, a driving chip, and a peripheral circuit connected to the voltage output circuit and the driving chip; wherein
the voltage output circuit is configured to provide a rated voltage of the laser source to the peripheral circuit;
the driving chip is configured to receive the effective current control signal, provide a current corresponding to the effective current control signal to the peripheral circuit according to the effective current control signal, receive the duty cycle control signal, and control the peripheral circuit to be turned on and off according to the duty cycle control signal; and
the peripheral circuit is configured to provide the current corresponding to the effective current control signal to the laser source according to the rated voltage.

5. The laser projection apparatus according to claim 4, wherein the projection light source includes at least one laser, the driving chip includes at least one processing module; each processing module is configured to control one laser of the at least one laser, and a pin of each processing module is connected to a sampling resistor.

6. The laser projection apparatus according to claim 5, wherein the driving chip further includes a function pin configured to detect a magnitude of a driving current in the peripheral circuit.

7. The laser projection apparatus according to claim 5, wherein the driving chip further includes a control pin, the driving chip is further configured to adjust a driving current $I_{LD}$ of the laser according to an input voltage of the control pin, and a formula for calculating the driving current $I_{LD}$ is:

$$I_{LD} = \frac{V_{CTRL} - 100 \text{ mV}}{R_{LD} \cdot 10},$$

wherein $V_{CTRL}$ is the input voltage of the control pin, and $R_{LD}$ is the resistance value of the sampling resistor.

8. The laser projection apparatus according to claim 1, wherein the display control circuit further includes:
a processor configured to generate the N current control signals and the M enable signals that correspond to each of the plurality of frames of images, wherein the N current control signals include current control signals that are in one-to-one correspondence with the M primary colors of each frame of image, and a hybrid-color current control signal;
a data selector connected to the processor and the laser source driving circuit, the data selector being configured to receive the N current control signals and the M enable signals, select the effective current control signal from the N current control signals according to the M enable signals, and transmit the effective current control signal to the laser source driving circuit; and
a signal generator connected to the laser source driving circuit, the signal generator being configured to generate a duty cycle control signal, and transmit the duty cycle control signal to the laser source driving circuit; wherein
the laser source driving circuit is configured to adjust a current of the laser source according to the effective current control signal and control the laser source to be turned on and off according to the duty cycle control signal.

9. The laser projection apparatus according to claim 8, wherein the data selector is configured such that, if a potential of an enable signal corresponding to one of the M primary colors is an effective potential, and potentials of enable signals corresponding to other primary colors in the M primary colors are ineffective potentials, a current control signal corresponding to the one primary color is used as the effective current control signal; and, if potentials of enable signals corresponding to at least two of the M primary colors are effective potentials, the hybrid-color current control signal is used as the effective current control signal.

10. The laser projection apparatus according to claim 9, wherein the data selector includes:
a plurality of data input terminals configured to receive the N current control signals;
at least one logic pin configured to receive the M enable signals; and
an output pin configured to output the effective current control signal.

11. The laser projection apparatus according to claim 8, wherein the signal generator is further connected to the processor, and the signal generator is configured to receive the M enable signals and generate the duty cycle control signal according to the M enable signals.

12. The laser projection apparatus according to claim 8, wherein the display control circuit further includes a digital to analog converter connected to the processor and the data selector; and the digital to analog converter is configured to receive the N current control signals in form of digital signals from the processor, convert the N current control signals in the form of digital signals into N current control signals in form of analog signals, and transmit the N current control signals in the form of analog signals to the data selector.

13. The laser projection apparatus according to claim 8, wherein the control processor is further connected to the data selector, and the control processor is further configured to transmit the N current control signals and the M enable signals to the data selector.

14. The laser projection apparatus according to claim 13, wherein the control processor includes a master control processor and a slave control processor; the master control processor is connected to the algorithm processor, the data selector, and the light modulation device; and the slave control processor is connected to the algorithm processor and the light modulation device;

the algorithm processor is further configured to transmit the N current control signals, the M enable signals, and first sub-data to the master control processor, and transmit second sub-data to the slave control processor; wherein the first sub-data and the second sub-data are configured to constitute the image display data;

the master control processor is configured to receive the N current control signals and the M enable signals, transmit the N current control signals and the M enable signals to the data selector, and transmit the first sub-data to the light modulation device;

the slave control processor is configured to transmit the second sub-data to the light modulation device; and the light modulation device is configured to modulate the beams emitted by the laser source according to the first sub-data and the second sub-data to generate the image beams.

15. The laser projection apparatus according to claim 1, wherein magnitudes of effective current control signals corresponding to at least two of the plurality of frames of images are different.

16. The laser projection apparatus according to claim 15, wherein the at least two frames of images are separated by at least one frame of image.

17. The laser projection apparatus according to claim 15, wherein the at least two frames of images are consecutive to each other.

18. The laser projection apparatus according to claim 1, wherein N is equal to 4 (N=4), and M is equal to 3 (M=3).

19. The laser projection apparatus according to claim 1, wherein the light modulation device is a digital micro mirror device (DMD) or a liquid crystal on silicon (LCOS).

20. The laser projection apparatus according to claim 1, wherein each current control signal is a pulse width modulation (PWM) signal.

* * * * *